(12) United States Patent
Miyajima et al.

(10) Patent No.: US 11,122,207 B2
(45) Date of Patent: Sep. 14, 2021

(54) ELECTRONIC APPARATUS, METHOD FOR CONTROLLING THE SAME, COMPUTER READABLE NONVOLATILE RECORDING MEDIUM

(71) Applicant: CANON KABUSHIKI KAISHA, Tokyo (JP)

(72) Inventors: Takuro Miyajima, Kawasaki (JP); Ryu Wakui, Tokyo (JP); Takeshi Kikkawa, Yokohama (JP); Naomi Mori, Kawasaki (JP); Mayu Asano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/752,431

(22) Filed: Jan. 24, 2020

(65) Prior Publication Data

US 2020/0162676 A1    May 21, 2020

Related U.S. Application Data

(63) Continuation of application No. PCT/JP2018/027016, filed on Jul. 19, 2018.

(30) Foreign Application Priority Data

Jul. 31, 2017 (JP) .............................. JP2017-148617
Jul. 31, 2017 (JP) .............................. JP2017-148618

(51) Int. Cl.
*H04N 5/232* (2006.01)
*G06F 3/0482* (2013.01)
(Continued)

(52) U.S. Cl.
CPC ..... *H04N 5/232933* (2018.08); *G06F 3/0482* (2013.01); *G06F 3/0484* (2013.01)

(58) Field of Classification Search
CPC ............ H04N 5/232933; G06F 3/0482; G06F 3/0488
See application file for complete search history.

(56) References Cited

U.S. PATENT DOCUMENTS

| | | | |
|---|---|---|---|
| 2008/0084398 A1* | 4/2008 | Ito .................... | H04N 5/23293 345/173 |
| 2014/0078370 A1* | 3/2014 | Yoshimi ............... | G06F 3/0482 348/333.01 |
| 2014/0223376 A1* | 8/2014 | Tarvainen ............ | G06F 3/0482 715/833 |

FOREIGN PATENT DOCUMENTS

| JP | 2001-036780 A | 2/2001 |
|---|---|---|
| JP | 2008-060866 A | 3/2008 |

(Continued)

*Primary Examiner* — Christopher K Peterson
(74) *Attorney, Agent, or Firm* — Canon U.S.A., Inc. IP Division

(57) ABSTRACT

An electronic apparatus includes a first selection unit which selects one of items in a first layer, a second selection unit which selects one of items in a second layer which become selectable when one of the items in the first layer is selected, a display controller which performs control such that the items in the first layer are displayed in a first direction and the items in the second layer are displayed in the first direction in a first display unit, and a controller which performs control such that, even when the first selection unit selects one of the items in the first layer, the items in the first layer are not shifted and the selected item in the second layer is displayed in a position corresponding to a display position of a corresponding one of the items in the first layer in the first direction.

18 Claims, 17 Drawing Sheets

(51) Int. Cl.
*G06F 3/0488* (2013.01)
*G03B 17/18* (2021.01)
*G06F 3/0484* (2013.01)

(56) References Cited

FOREIGN PATENT DOCUMENTS

| | | |
|---|---|---|
| JP | 2008-203907 A | 9/2008 |
| JP | 2009-099067 A | 5/2009 |
| JP | 2011-141431 A | 7/2011 |
| JP | 2011-159166 A | 8/2011 |
| JP | 2012-085258 A | 4/2012 |
| JP | 2012-094062 A | 5/2012 |
| JP | 2014-006875 A | 1/2014 |
| JP | 2014-178942 A | 9/2014 |
| JP | 2015-022339 A | 2/2015 |

\* cited by examiner

ELECTRONIC APPARATUS, METHOD FOR CONTROLLING THE SAME, COMPUTER READABLE NONVOLATILE RECORDING MEDIUM

CROSS-REFERENCE TO RELATED APPLICATIONS

This application is a Continuation of International Patent Application No. PCT/JP2018/027016, filed Jul. 19, 2018, which claims the benefit of Japanese Patent Application No. 2017-148617 filed Jul. 31, 2017 and No. 2017-148618, filed Jul. 31, 2017, all of which are hereby incorporated by reference herein in their entirety.

TECHNICAL FIELD

The present invention relates to an electronic apparatus capable of displaying a setting screen and a method for controlling the electronic apparatus.

BACKGROUND ART

Methods for fixing a position where a selected setting value is displayed in a predetermined position have been proposed. In PTL 1, a list of setting items and a list of setting values are displayed in respective regions which are parallel to each other. Furthermore, according to PTL 1, an item selected from among the setting items is displayed in a center position, and a setting value selected from among selectable candidates of a setting value corresponding to the selected item is also displayed in a center position.

According to a method disclosed in PTL 1, since the selected item is displayed in the center position, an item positioned at an end of a line may be positioned out of a display screen if the number of items to be displayed is large, depending on a position of the selected item. When the method disclosed in PTL 1 is employed, a list of selectable items may not be viewed when a setting operation is performed, and therefore, a user may not view other items while performing a setting of a certain item. To address this problem, if display positions of the items are not changed, a selected setting value is displayed in the center position, and therefore, the user may mistakenly recognize that the selected setting value corresponds to an item near the center position.

CITATION LIST

Patent Literature

PTL 1 Japanese Patent Laid-Open No. 2011-159166

SUMMARY OF INVENTION

The present invention is made in view of the problem described above and an object of the present invention is to provide an electronic apparatus capable of improving visibility of displayed items when the items are set.

Further features of the present invention will become apparent from the following description of exemplary embodiments with reference to the attached drawings.

DESCRIPTION OF EMBODIMENTS

Figure 1:
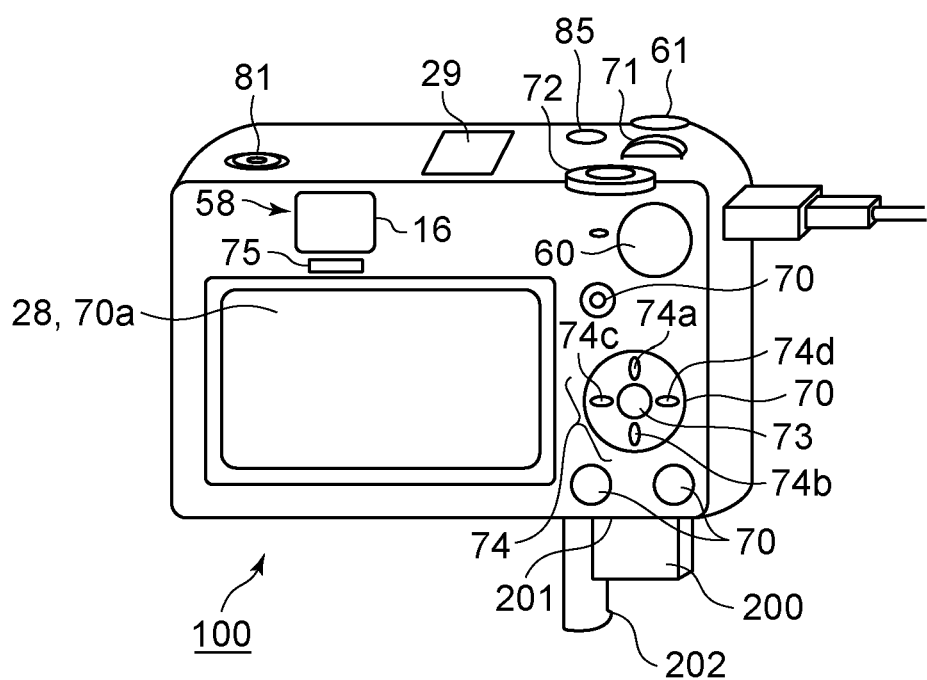
FIG. 1 is a diagram illustrating appearance of a digital still camera which is an example of an apparatus to which a configuration of an embodiment is applicable.

Preferred embodiments of the present invention will be described hereinafter with reference to the accompanying drawings. FIG. 1 is a diagram illustrating appearance of a digital still camera 100 which is an electronic apparatus to which the present disclosure is applicable according to an embodiment. FIG. 1 is a perspective view of a back surface of the digital still camera 100.

In FIG. 1, a display section 28 displays images and various information and is integrated with a touch panel 70a. A lens unit is disposed on a front surface of the digital still camera 100. A shutter button 61 is an operation unit used to issue an instruction for imaging. A mode switch 60 is an operation unit used to perform switching among various modes. A main electronic dial 71 and a sub-electronic dial 72 are rotatable operation members which are used to shift an item to be selected and change a setting value. The main electronic dial 71 is disposed substantially at a center on an upper surface of the digital still camera 100 in a Y direction and disposed on a right side when viewed from the back surface. The sub-electronic dial 72 is disposed in a position between the back surface and the upper surface of the digital still camera 100. The main electronic dial 71 is rotatable by moving a finger in the X direction on the upper surface which is laterally long in the X direction, and therefore, is disposed in a certain position so as to be easily operated by a pointing finger in a state in which the user holds the camera. The sub-electronic dial 72 is rotatable by moving a finger along the back surface, and therefore, is disposed in a certain position so as to be easily operated by a thumb in the state in which the user holds the camera. Accordingly, the main electronic dial 71 is disposed on an upper side or a far side relative to the sub-electronic dial 72 when viewed from the user who holds the camera.

A power switch 81 is an operation member which performs switching between ON and OFF of a power source of the digital still camera 100. An arrow key 74 is a four-direction key which has upper, lower, left, and right portions which may be pressed. An Fn button (function button) 85 is used to perform switching between display and non-display of a multi-setting screen including a plurality of items having setting values which are changeable in accordance with an operation performed on the rotatable member.

An upper surface display section 29 is disposed on the upper surface of the digital still camera 100 and has a display region smaller than that of the display section 28. An in-finder display section 58 is visually recognized through a finder 16, and therefore, when the user views display, the in-finder display section 58 is larger than the upper surface display section 29.

Furthermore, resolution of the display section 28 and the in-finder display section 58 is higher than that of the upper surface display section 29. Although the display section 28 and the in-finder display section 58 may display a live-view (LV) image, the resolution of the upper surface display section 29 is not so high that an LV image may not be displayed. Assuming that a width of the display section 28 is approximately 8 cm, 9 cm, or so a width of the upper surface display section 29 is approximately 1.5 cm, 2 cm, or so.

An operation corresponding to a pressed portion on the arrow key 74 may be performed. A SET button 73 is mainly pressed when a selected item is determined. The shutter button 61, the main electronic dial 71, the sub-electronic dial 72, the power switch 81, the arrow key 74, the SET button 73, and the touch panel 70a are included in an operation unit 70.

When the finder 16 is viewed, the in-finder display section 58 is visually recognized. Display may be switched between the in-finder display section 58 and the display section 28 when an object approaching the finder 16 is detected or a button is operated, for example. The detection of approach of an object to the finder 16 may be performed by an approach sensor 75. The approach sensor 75 detects an object approaching the finder 16 within a distance of 2 cm or 3 cm, for example, or an object separated from the finder 16.

A recording medium 200 is a memory card, a hard disk, or the like. A recording medium slot 201 stores the recording medium 200. The recording medium 200 stored in the recording medium slot 201 may communicate with the digital still camera 100 and may be subjected to recording or reproducing. A lid 202 is for the recording medium slot 201. In FIG. 1, a state in which the lid 202 is opened and a portion of the recording medium 200 is drawn from the recording medium slot 201 so as to be exposed is illustrated.

Figure 2:
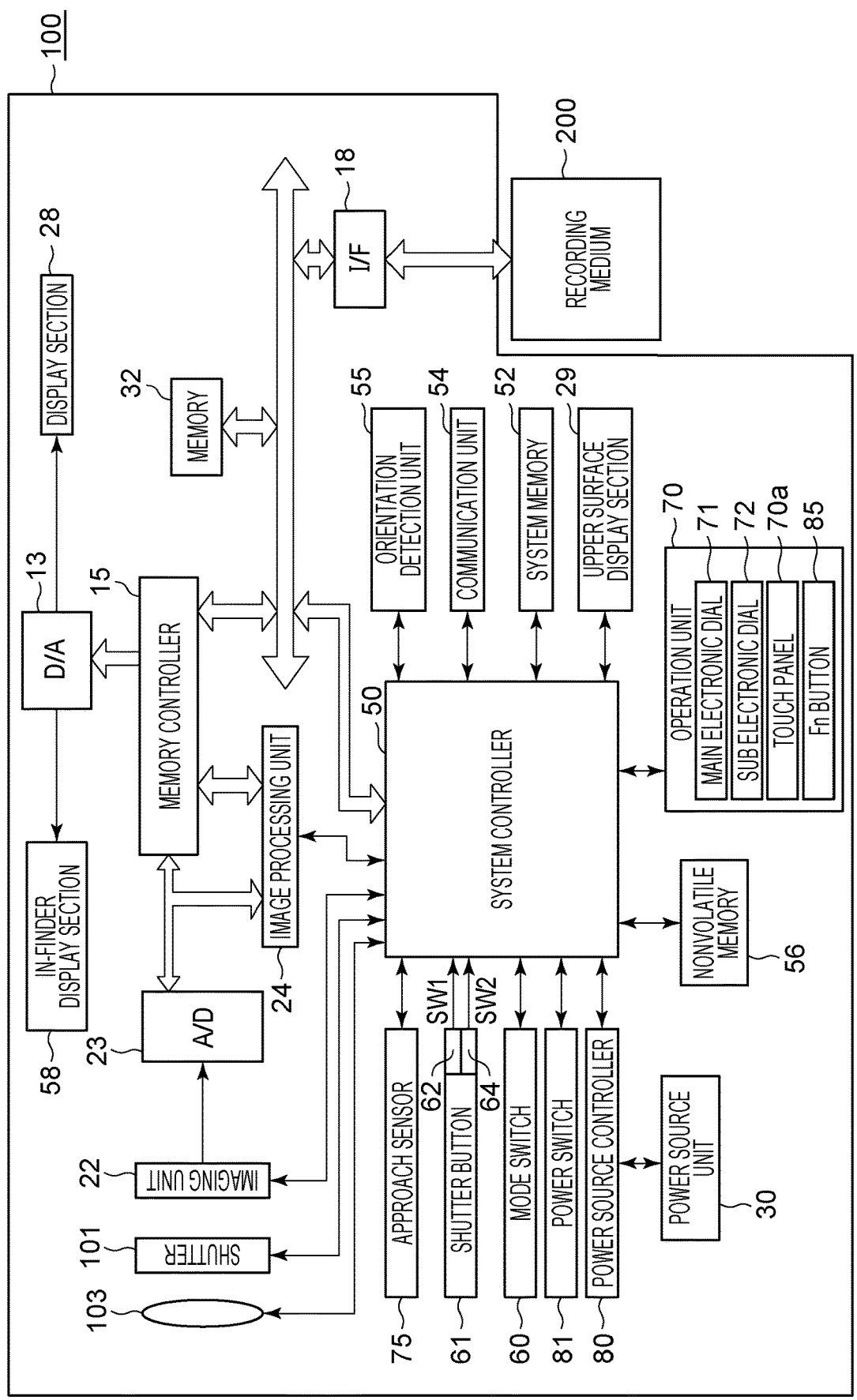
FIG. 2 is a diagram illustrating an example of a configuration of the digital still camera which is the example of the apparatus to which the configuration of the embodiment is applicable.

FIG. 2 is a block diagram illustrating an example of a configuration of the digital still camera 100 according to this embodiment. In FIG. 2, an imaging lens 103 is a lens group including a zoom lens and a focus lens. A shutter 101 has a diaphragm function. An imaging unit 22 is an imaging element including a charge-coupled device (CCD) sensor or a complementary metal-oxide semiconductor (CMOS) sensor which converts an optical image into an electric signal. An A/D converter 23 is used to convert an analog signal output from the imaging unit 22 into a digital signal.

An image processing unit 24 performs predetermined pixel interpolation, a resizing process, such as size reduction, and a color conversion process on data supplied from the A/D converter 23 or data supplied from a memory controller 15. Furthermore, the image processing unit 24 performs a predetermined calculation process using data on a captured image, and a system controller 50 performs exposure control and ranging control based on an obtained result of the calculation. By this, an autofocus (AF) process of a through-the-lens (TTL) system, an auto-exposure (AE) process, and a flash preliminary light emission (EF) process are performed. The image processing unit 24 further performs a predetermined calculation process using the data on a captured image and also performs an auto white balance (AWB) process of the TTL system based on an obtained result of the calculation. Data output from the A/D converter 23 is directly written in a memory 32 through the image processing unit 24 and the memory controller 15 or through the memory controller 15 without using the image processing unit 24.

The memory 32 stores image data obtained by the imaging unit 22 and converted into digital data by the A/D converter 23 and image data to be displayed in the display section 28. The memory 32 has a sufficient storage capacity to store a predetermined number of still images and a moving image and audio for a predetermined period of time. Furthermore, the memory 32 serves as a memory for image display (a video memory). A D/A converter 13 converts the data for image display stored in the memory 32 into an analog signal to be supplied to the display section 28. The image data for display written in the memory 32 is displayed in the display section 28 or the in-finder display section 58 through the D/A converter 13. The display section 28 and the in-finder display section 58 perform display on a display device, such as a liquid crystal display, in accordance with the analog signal supplied from the D/A converter 13. Digital signals which have been subjected to the A/D conversion by the A/D converter 23 and stored in the memory 32 are subjected to analog conversion performed by the D/A converter 13 and are successively transferred to the display section 28 and the in-finder display section 58 for display. Accordingly, the display section 28 and the in-finder display section 58 function as an electronic view finder. In this way, through-image display (live-view display) may be performed. Furthermore, the upper surface display section 29 may not display an LV image but may display an icon indicating a set item and candidates of a setting value.

A nonvolatile memory 56 is a recording medium which is electrically erasable, recordable, and readable by the system controller 50, and an electrically erasable programmable read-only memory (EEPROM) or the like is used as the nonvolatile memory 56. The nonvolatile memory 56 stores constants and programs for operation of the system controller 50 and the like. The term programs indicates computer programs used to execute various flowcharts described below in this embodiment.

The system controller 50 incorporates at least one processor and controls the entire digital still camera 100. Various processes of this embodiment described below are realized when the programs stored in the nonvolatile memory 56 described above are executed. A random access memory (RAM) is used for a system memory 52. Constants and variables for operation of the system controller 50, programs read from the nonvolatile memory 56, and the like are developed in the system memory 52. Furthermore, the system controller 50 also performs display control by controlling the memory 32, the D/A converter 13, the display section 28, and the like. A mode switch 60, the shutter button 61, and the operation unit 70 are used to input various types of operation instruction to the system controller 50.

The mode switch 60 performs switching of an operation mode of the system controller 50 among a still-image recording mode, a moving-image shooting mode, and a reproducing mode. The still-image recording mode includes an auto imaging mode, an auto scene determination mode, a manual mode, various scene modes having different imaging settings for different imaging scenes, a program AE mode, and a custom mode. The mode switch 60 performs switching so that one of the modes included in a menu screen is directly entered. Alternatively, after the mode switch 60 first performs switching to the menu screen, one of the modes included in the menu screen may be entered using another operation member. Similarly, the moving-image shooting mode may include a plurality of modes.

A first shutter switch 62 is turned on when the shutter button 61 disposed on the digital still camera 100 is subjected to a so-called half-press (an instruction for imaging preparation) in the course of operation of the shutter button 61 and generates a first shutter switch signal SW1. The first shutter switch signal SW1 starts operation of the AF process, the AE process, the AWB process, the EF process, and the like. A second shutter switch 64 is turned on when the operation of the shutter button 61 is completed, that is, when so-called full-press of the shutter button 61 is performed (an imaging instruction) and generates a second shutter switch signal SW2. The system controller 50 starts a series of operations of an imaging process including a still-image capturing operation performed by the imaging unit 22, an operation of reading a signal supplied from the imaging unit 22, and an operation of writing image data in the recording medium 200 in response to the second shutter switch signal SW2.

The individual operation members of the operation unit 70 have appropriate functions suitable for scenes assigned thereto and function as various function buttons when various function icons displayed in the display section 28, the in-finder display section 58, and the upper surface display section 29 are selectively operated. Examples of the function buttons include an end button, a return button, a selection switch button, and a setting value switch button. For example, when a menu button is pressed, a menu screen which allows various settings is displayed in the display section 28. The user may intuitively perform various settings using the menu screen displayed in the display section 28, the four-direction button indicating the upper, lower, left, and right directions, and the SET button. In a setting screen (a multi-setting screen) described below, an item in which a setting is to be changed is changed in a parent layer by a rotation operation of the sub-electronic dial 72 and a setting value is changed in a child layer by a rotation operation of the main electronic dial 71. When the Fn button 85 is pressed, the multi-setting screen is displayed which is superposed on an LV image while the LV image is displayed. A plurality of items displayed in the multi-setting screen are selected and set by the user in advance.

A power source controller 80 includes a battery detection circuit, an DC-DC converter, and a switch circuit which changes a block to which electric power is supplied, and performs detection of an attached battery, a type of the battery, and an amount of remaining battery. Furthermore, the power source controller 80 controls the DC-DC converter based on results of the detections and an instruction issued by the system controller 50 and supplies a required voltage to the various units including the recording medium 200 for a required period of time. A power source unit 30 include a primary battery, such as an alkali battery or a lithium battery, a secondary battery, such as a NiCd battery, a NiMH battery, or a Li battery, and an AC adaptor. A recording medium I/F 18 is an interface with the recording medium 200, such as a memory card or a hard disk. The recording medium 200 is a nonvolatile recording medium, such as a memory card, for recording an image obtained at a time of imaging, and is constituted by a semiconductor memory, an optical disc, a magnetic disk, or the like. The power switch 81 is used to perform switching between power ON and power OFF of the power source of the digital still camera 100.

A communication unit 54 is used for connection to an external apparatus or a network in a wireless manner or by a wired cable so as to perform transmission and reception of a video image, an audio signal, and the like. The communication unit 54 may be connected to a wireless local area network (LAN) and the Internet. The communication unit 54 may transmit an image captured by the imaging unit 22 (including a through image) and an image recorded in the recording medium 200 and further receive image data and other various information from an external apparatus.

An orientation detection unit 55 detects an orientation of the digital still camera 100 relative to a direction of gravity. It may be determined whether an image has been captured by the imaging unit 22 in a state in which the digital still camera 100 is in a horizontal state or a vertical state. The system controller 50 may add direction information corresponding to the orientation detected by the orientation detection unit 55 to an image file of an image captured by the imaging unit 22 and record the image after the image is rotated. Examples of the orientation detection unit 55 include an acceleration sensor and a gyro sensor. The approach sensor 75 detects an object approaching the finder 16.

Note that the operation unit 70 includes the touch panel 70a capable of detecting a contact to the display section 28. The touch panel 70a and the display section 28 may be integrally configured. For example, the touch panel 70a is configured such that light transmissivity does not adversely affect the display in the display section 28 and is disposed on an upper layer of a plane of the display section 28. Then input coordinates on the touch panel 70a are associated with display coordinates on the display section 28. By this, a graphical user interface (GUI) may be configured as if the user may directly operate the screen displayed on the display section 28. The system controller 50 may detect operations on the touch panel 70a or states described below.

- An operation of newly touching a touch panel by a finger or a pen which has not touched the touch panel, that is, a start of a touch (hereinafter referred to as "Touch-Down").
- A state in which the touch panel is being touched by a finger or a pen (hereinafter referred to as "Touch-On").
- An operation of moving a finger or a pen which is touching the touch panel (hereinafter referred to as "Touch-Move").
- Separation of a finger or a pen which has touched the touch panel from the touch panel, that is, an end of a touch (hereinafter referred to as "Touch-Up").
- A state in which nothing is touching the touch panel (hereinafter referred to as "Touch-Off").

After Touch-Down is detected, Touch-On is simultaneously detected. After Touch-Down, normally, Touch-On is continuously detected unless Touch-Up is detected. Similarly, Touch-Move is detected while Touch-On is detected. When a touch position is not shifted even if Touch-On is detected, Touch-Move is not detected. After Touch-Up of all fingers and pens which have touched the touch panel is detected, Touch-Off is detected.

By the operations, the states, and a positional coordinate on which a finger or a pen has touched the touch panel 70a are transmitted to the system controller 50 through an internal bus, and the system controller 50 determines content of an operation performed on the touch panel 70a based on the transmitted information. A shift direction of a finger or a pen which moves on the touch panel 70a in Touch-Move may be determined based on a change of a positional coordinate for each vertical component and horizontal component on the touch panel 70a. Furthermore, it is assumed that a stroke is rendered when Touch-Down is performed on the touch panel 70a and Touch-Up is performed through certain Touch-Move. A quick stroke operation is referred to as flicking. The flicking is an operation of quickly moving a finger which has touched the touch panel 70a by a certain distance and separating the finger. That is, the flicking is an operation of quickly performing tracing on the touch panel 70a such that the touch panel 70a is flicked by the finger. It is determined that the flicking is performed when Touch-Move at a predetermined speed or more for a predetermined distance or more is detected and Touch-Up is detected immediately after Touch-Move. Furthermore, in a case where Touch-Move at a speed less than the predetermined speed for the predetermined distance or more is detected, it is determined that drugging has been performed. The touch panel 70a may employ any method, such as a resistance film method, an electrostatic capacitance method, a surface acoustic wave method, an infrared method, an electromagnetic induction method, an image recognition method, or an optical sensor method. It is determined that a touch is detected by a contact onto the touch panel 70a or a touch is detected by an approach of a finger or a pen to the touch panel 70a depending on the method. However, any method may be employed.

Figure 5:
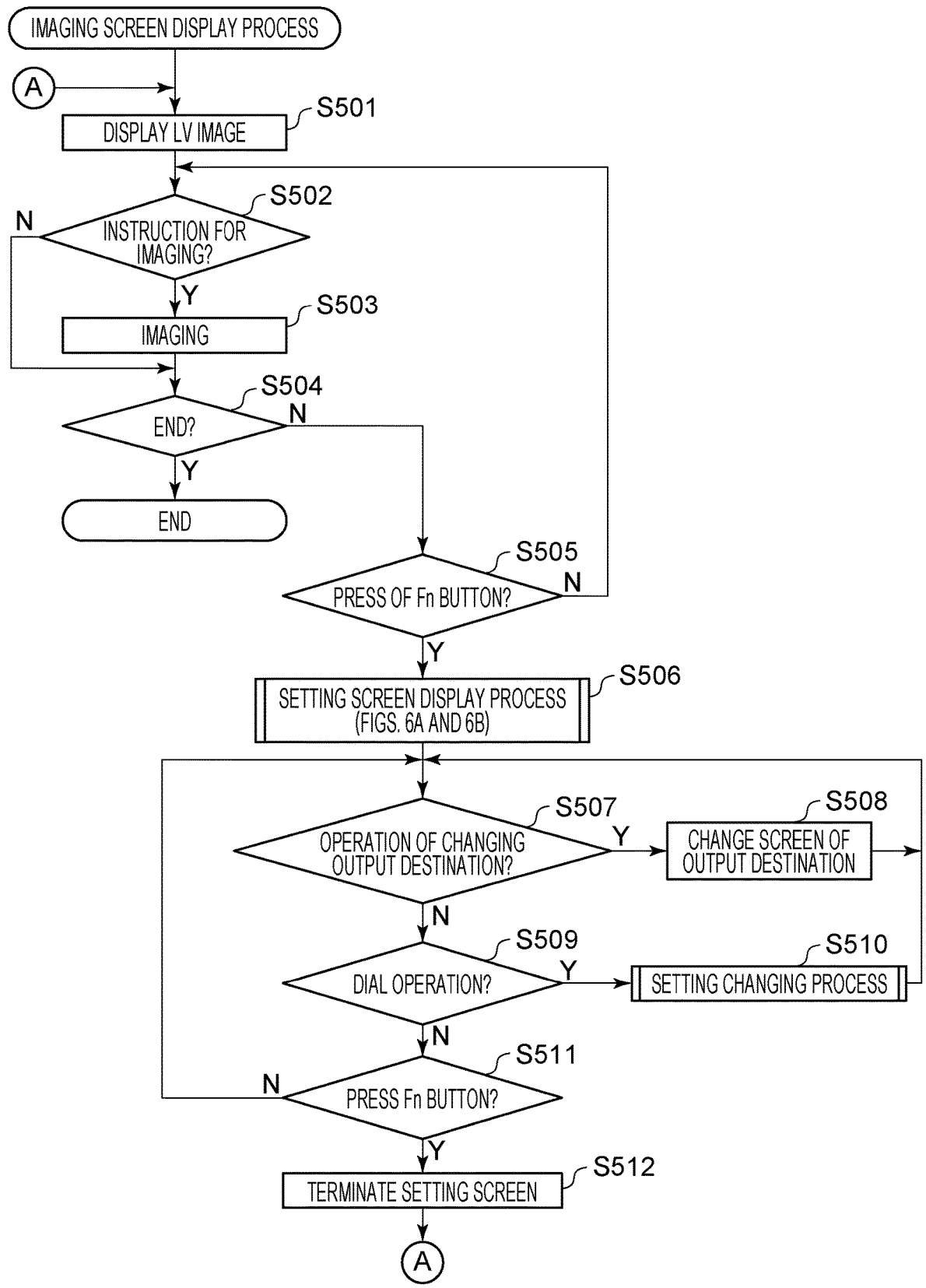
FIG. 5 is a flowchart of an imaging screen display process according to the embodiment.

Next, an imaging screen display process in this embodiment will be described with reference to FIG. 5. FIG. 5 is a flowchart of a process of displaying the imaging screen in an imaging mode according to this embodiment. This process is realized when a program recorded in the nonvolatile memory 56 is developed in the system memory 52 and the system controller 50 executes the program. Note that this process is started when the digital still camera 100 is powered and enters the imaging mode.

In step S501, the system controller 50 displays an LV image (a live-view image or a captured image) in the display section 28. An LV image is displayed in the display section 28 as represented by an LV image 301 of FIG. 3A.

In step S502, the system controller 50 determines whether an imaging instruction has been issued. When the determination is affirmative, the process proceeds to step S503, and otherwise, the process proceeds to step S504. The imaging instruction may be performed by pressing the shutter button 61.

In step S503, the system controller 50 performs imaging. In the imaging, a captured image is obtained by the imaging unit 22 and is recorded in the recording medium 200. Here, the imaging is performed with setting values for the imaging which are currently set. For example, when a value of ISO sensitivity is changed in a setting value described below, the imaging is performed using the changed value.

In step S504, the system controller 50 determines whether the imaging screen display process is to be terminated. When the determination is affirmative, the imaging screen display process is terminated, and otherwise, the process proceeds to step S505. The imaging screen display process is terminated when the digital still camera 100 is powered off, when a reproduction screen is displayed, or when the menu screen is displayed.

In step S505, the system controller 50 determines whether the Fn button 85 has been pressed. When the determination is affirmative, the process proceeds to step S506, and otherwise, the process returns to step S502.

In step S506, the system controller 50 performs a process of displaying the setting screen. The process of displaying the setting screen will be described below with reference to FIGS. 6A and 6B. When the Fn button 85 is pressed while the LV image is displayed, the setting screen is displayed such that the setting screen is superposed on the LV image.

In step S507, the system controller 50 determines whether an operation of changing an output destination for displaying the LV image has been performed. When the determination is affirmative, the process proceeds to step S508, and otherwise, the process proceeds to step S509. The change of the output destination means switching of the output destination between the display section 28 and the in-finder display section 58, and in a case where an object approaching the finder 16 is detected by the approach sensor 75 as described above, display is switched from the display section 28 to the in-finder display section 58. If the approach sensor 75 detects a separation of an object from the finder 16 while the LV image is displayed in the in-finder display section 58, the display is switched to the display section 28. A display destination of the LV image is switched between the display section 28 and the in-finder display section 58 also when a display destination switch button (a button included in the operation unit 70) is pressed.

In step S508, the system controller 50 changes an output destination.

In step S509, the system controller 50 determines whether a dial operation has been performed. The dial operation indicates an operation performed on the main electronic dial 71 or the sub-electronic dial 72. When the determination is affirmative, the process proceeds to step S510, and otherwise, the process proceeds to step S511.

In step S510, the system controller 50 performs a setting change process. In the setting change process, an item in which a setting is to be changed is selected in the setting screen displaying a plurality of setting items and a setting value of the selected item is changed. The setting change process will be described below with reference to FIGS. 7A and 7B.

In step S511, the system controller 50 determines whether the Fn button 85 has been pressed. When the determination is affirmative, the process proceeds to step S512, and otherwise, the process returns to step S507. When the Fn button 85 is pressed while the setting screen is displayed, the setting screen is brought into a non-display state.

In step S512, the system controller 50 terminates the display of the setting screen and the process returns to step S501. After the display of the setting screen is terminated, the LV image is displayed in the display section 28.

Next, the setting screen display process will be described with reference to FIGS. 6A and 6B. This process is realized when a program recorded in the nonvolatile memory 56 is developed in the system memory 52 and the system controller 50 executes the program. The setting screen display process is started when the process proceeds to step S506 in FIG. 5. Although a case where the setting screen is displayed in the display section 28 and the upper surface display section 29 is described as an example in the embodiment below, the setting screen may be displayed in the in-finder display section 58 instead of the display section 28.

In step S601, the system controller 50 determines the upper surface display section 29 and the display section 28 (or the in-finder display section 58) as an output destination.

Figure 3A:
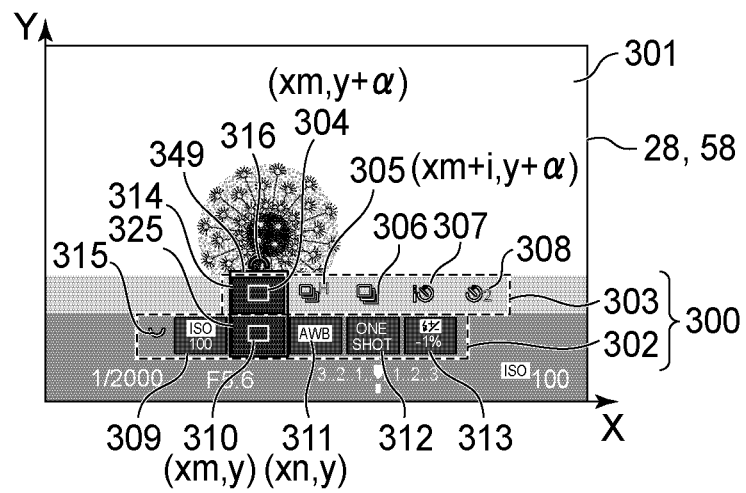
FIG. 3A is a diagram illustrating a display example of a setting screen according to the embodiment.
Figure 3B:
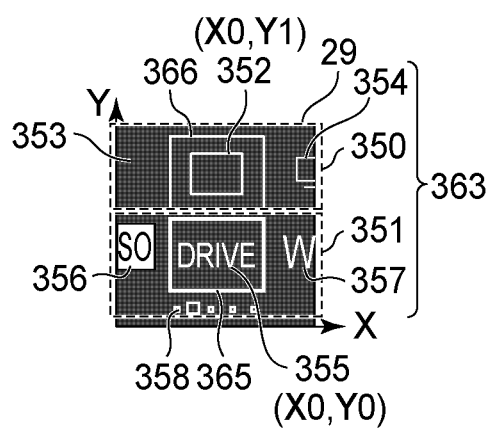
FIG. 3B is a diagram illustrating a display example of the setting screen according to the embodiment.
Figure 3C:
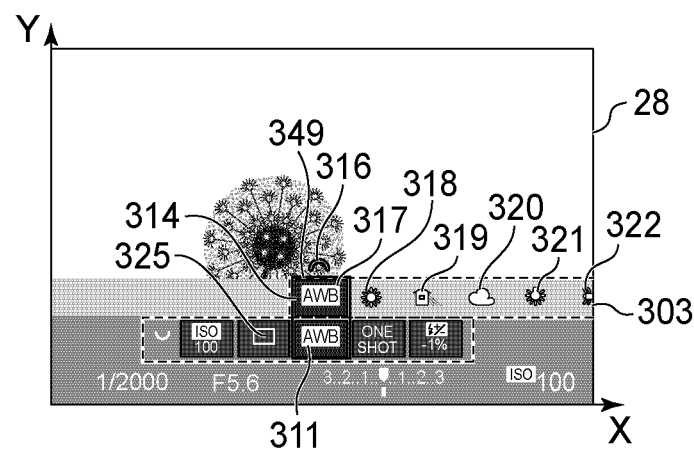
FIG. 3C is a diagram illustrating a display example of the setting screen according to the embodiment.
Figure 3D:
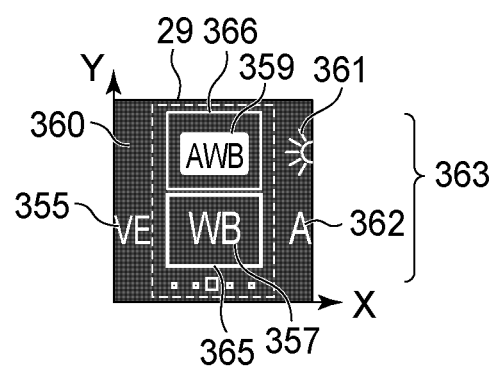
FIG. 3D is a diagram illustrating a display example of the setting screen according to the embodiment.
Figure 3E:
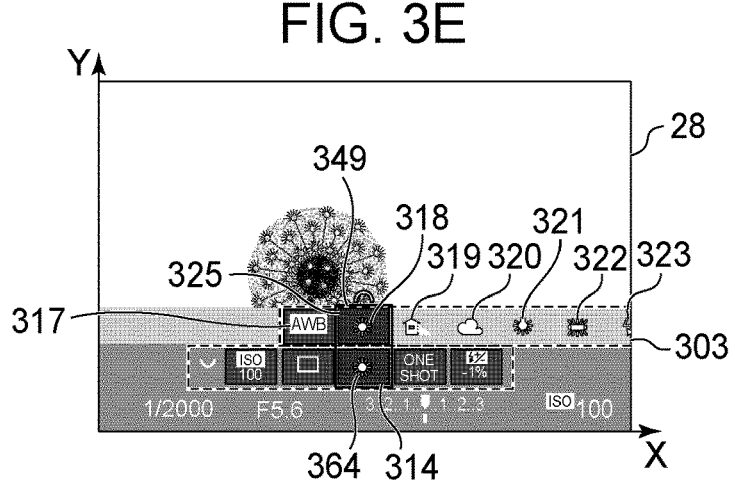
FIG. 3E is a diagram illustrating a display example of the setting screen according to the embodiment.
Figure 3F:
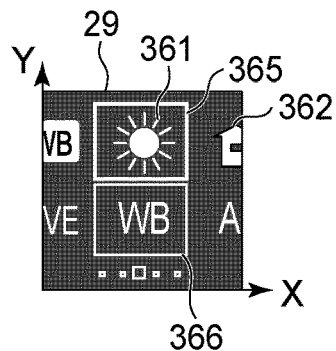
FIG. 3F is a diagram illustrating a display example of the setting screen according to the embodiment.

In step S602, the system controller 50 determines whether a selected setting item (D=M) is valid. The selected setting item has been recorded in the system memory 52. The system controller 50 writes the selected setting item in the nonvolatile memory 56 when the digital still camera 100 is powered off and reads the selected setting item from the nonvolatile memory 56 into the system memory 52 when the digital still camera 100 is powered. The selected setting item indicates a setting item which is selected by the user when the setting screen is last displayed. Note that if the user has not selected a setting item, an item in a predetermined order, such as an item which is positioned at an end in a display order, is determined as a selected item. FIGS. 3A to 3G are diagrams illustrating examples of display of the setting screen. FIGS. 3A, 3C, 3E, and 3G are display examples of the display section 28 (or the in-finder display section 58), and FIGS. 3B, 3D, and 3F are display examples of the upper surface display section 29. As illustrated in a setting screen 300 (a parent item group 302 and a child item group 303) of FIG. 3A, the parent item group 302 includes setting items in which settings thereof may be changed and the child item group 303 includes candidates of a setting value of a selected setting item. The parent item group 302 and the child item group 303 are arranged in parallel to each other along an X axis, and icons of the setting items and the setting values are displayed in parallel to each other. When any of the setting items has not been selected, one of the setting items is selected. In the display example of FIG. 3A, it is determined whether a currently-selected setting item (the icon 310) is valid among five icons 309 to 313. Note that the icon 309 indicates ISO sensitivity, the icon 310 indicates a drive mode, the icon 311 indicates white balance, the icon 312 indicates a focus setting, and the icon 313 indicates light modulation correction. In a case where a setting of a selected setting item is changeable or a case where a setting of a selected setting item is not changeable but a certain setting value has been set, it is determined that the setting item is valid. On the other hand, in a case where the setting is not changeable or a setting value has not been set, it is determined that the setting value is invalid. In a case where the selected setting item is a picture style and a recording method of a wide dynamic range has been set as image processing, the determination in step S602 is negative since the setting of the picture style is invalid. Examples of a case where a setting is invalid is described as below. In the moving-image mode, a still image may not be captured, and therefore, a setting of the drive mode is invalid. In a case where follow shot is set, the setting of the drive mode is invalid. In this way, some setting items become invalid depending on a mode or a setting. Note that, the selected setting item is denoted by D and a setting item selected as the setting item D is denoted by M. M is assigned to the setting item of the white balance, the setting item of the ISO sensitivity, the setting item of the drive mode, or the like. When the determination is affirmative in step S602, the process proceeds to step S606, and otherwise, the process proceeds to step S603.

In step S603, the system controller 50 determines whether a valid setting item is included in the setting items. When the determination is affirmative, the process proceeds to step S604, and otherwise, the process proceeds to step S605.

In step S604, the system controller 50 changes the selected setting item D=M. Specifically, one of the other items included in the setting screen is determined as a selected icon and the process proceeds. For example, if the setting item of the icon 309 (the ISO sensitivity) has been selected from among the icons 309 to 313, and the determination is negative in step S602, the setting item of the icon 310 (the drive mode) is determined as the setting item to be selected.

Figure 3G:
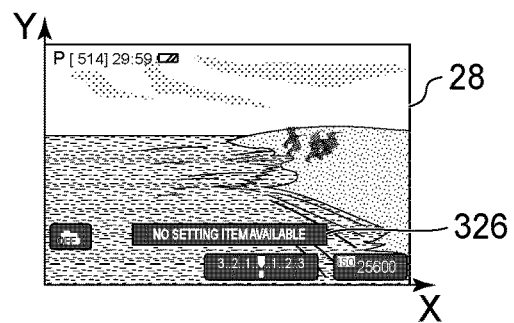
FIG. 3G is a diagram illustrating a display example of the setting screen according to the embodiment.

In step S605, the system controller 50 may not change a setting of a setting item since a valid setting item is not included, and therefore, the system controller 50 displays an alert. A guide 326 in FIG. 3G is an alert indicating that a setting of any of the setting items displayed in response to a press of the Fn button 85 may not be changed.

In step S606, the system controller 50 obtains a display coordinate of the selected setting item D=M in the display section 28. Alternatively, a display order in the parent item group 302 may be obtained. The display coordinate of the setting item D=M in the display section 28 corresponds to a position of display of the selected item in a region of the parent item group 302 in the setting screen 300 of FIG. 3A. Specifically, when the icon 310 is selected, a display coordinate of the icon 310 in the display section 28 is obtained in step S606. Alternatively, predetermined display coordinates for displaying the icons in the display region of the parent item group 302 are determined as positions 1 to 5 from a smallest value of an X coordinate, and one of the positions 1 to 5 which corresponds to the icon 310 is obtained. The display coordinates where the icons are displayed may be changed depending on the number of displayed setting items. In the case of the icon 310, the position 2 is obtained in step S606. In this embodiment, a display coordinate of the selected setting item D=M is denoted by (xm, y).

In step S607, the system controller 50 sets a display coordinate of the setting value to (xm, y+α). The display coordinate of the setting value indicates a display coordinate of an icon corresponding to the setting value of the selected setting item. Specifically, the display coordinate of the setting value is a display coordinate of a position of a selected icon in the child item group 303. The display position of the selected setting value is fixed for each setting item and is a coordinate which is the same as (corresponds to) that of the selected setting item in the X axis. As illustrated in the setting screen 300 of FIG. 3A, in the case where the icon 310 corresponds to the selected setting item in the parent item group 302, an immediately upper portion (in the Y axis) of the icon 310 is a display coordinate of a setting value, that is, a position where the icon 304 is displayed is the display coordinate of the setting value. In this way, since a display position of a selected child item is changed depending on a display position of a parent item, and a the selected child item is displayed an immediately upper portion of the parent item, the user may immediately recognize the selected item in the parent layer and the selected item in the child layer. In the child item group 303 of FIG. 3A, the icon 304 indicates a single shot, the icon 305 indicates a high-speed continuous shooting, the icon 306 indicates a low-speed continuous shooting, the icon 307 indicates a self-timer of 10 seconds/remote control imaging, and the icon 308 indicates a self-timer of 2 seconds. Setting values M which are candidates of a setting value displayed in the child item group 303 are denoted by i (i=1 to I), and when the selected setting item is the drive mode, the single shot, the high-speed continuous shooting, and the like are correspond to i. It is assumed that, in the child item group 303 of FIG. 3A, in the case where M is denoted by i, i of 1 indicates the icon 304, i of 2 indicates the icon 305, i of 3 indicates the icon 306, i of 4 indicates the icon 307, and i of 5 indicates the icon 308. The icon 304 which is currently selected from among the items 304 to 308 is displayed in a position corresponding to a position where the icon 310 is displayed in the parent item group 302.

In step S608, the system controller 50 performs a setting so that the icon M corresponding to the selected setting item D is displayed in a display coordinate (X0, Y0) in the upper surface display section 29 and records the setting in the system memory 52. As illustrated in a setting screen 363 which is displayed in the upper surface display section 29 in FIG. 3B, a selected icon 355 is displayed at a center of a parent item group 351. A display region of the upper surface display section 29 is smaller than that of the display section 28, and therefore, all the five setting items may not be displayed (in a size in which the user may recognize the individual icons). Therefore, the entire icon indicating the selected setting item is displayed and portions of the other icons of candidates of the setting value are displayed. Accordingly, a center position of the parent item group 351 is set as a display coordinate (X0, Y0) of the selected setting item D=M.

In step S609, the system controller 50 obtains a list of setting values selected as setting values of the setting items from the system memory 52. In the display example of FIG. 3A, as the icons 309 to 313 of the parent item group 302, the setting items of the ISO sensitivity, the drive mode, the white balance, the focus setting, and the light modulation correction are displayed, and in this case, the setting values of the individual setting items are obtained in step S609. Note that the display order in the display section 28 and the upper surface display section 29 coincides with order of the icons recorded in the system memory 52 (the nonvolatile memory 56). Basically, the individual icons are displayed from the left in the display region in order of the recorded icons (from 1 to N).

In a process from step S610 to step S612, an icon indicating the selected setting item is displayed in the parent item group 302 in the display section 28. Note that, in step S608, a process of performing a setting for displaying an icon indicating the selected setting item in the upper surface display section 29 is performed. In the upper surface display section 29, the selected setting item is indicated by the icon M representing the setting item (itself). However, in the display section 28, a display mode of an icon indicating the selected setting item is changed depending on a selected setting value.

In step S610, the system controller 50 determines whether a setting of the setting item D=M may be changed. When the determination is affirmative, the process proceeds to step S611, and otherwise, the process proceeds to step S612. In a case where a function of performing imaging a plurality of times by automatically changing exposure is valid, when the setting item is the white balance, the setting may not be changed in a second imaging operation onwards. Examples of the case where a setting of a setting item may not be change are described as below. In a case where the imaging mode indicates a manual mode and the ISO sensitivity is set other than an automatic setting, a setting of exposure correction may not be changed. In a case where the imaging mode is the moving-image mode, settings of the ISO sensitivity and the light modulation correction may not be changed. When the determination is affirmative in step S610, the process proceeds to step S611, and otherwise, the process proceeds to step S612.

In step S611, the system controller 50 sets an icon m of a selected setting value in white in the display section 28 when the setting item D is M. In the setting screen 300 displayed in the display section 28, the setting item is indicated by an icon representing a selected setting value. A background of the setting screen 300 is colored in black, and therefore, the icon is displayed in white in this case. However, when the background is white, the icon may be displayed in black or the icon may be represented by a line thicker than the other icons. That is, a display mode is not limited to that described above. In the setting screen 300 in FIG. 3A, the icon 310 indicating the setting item D=M is displayed by the icon 304 (the item m) indicating a single shot set as the setting value of the drive mode. Furthermore, a setting of the setting item D=M may be changed, and therefore, the setting item is displayed in white so that it is recognizable that the setting item is selectable and a setting of the setting item is changeable.

Figure 4A:
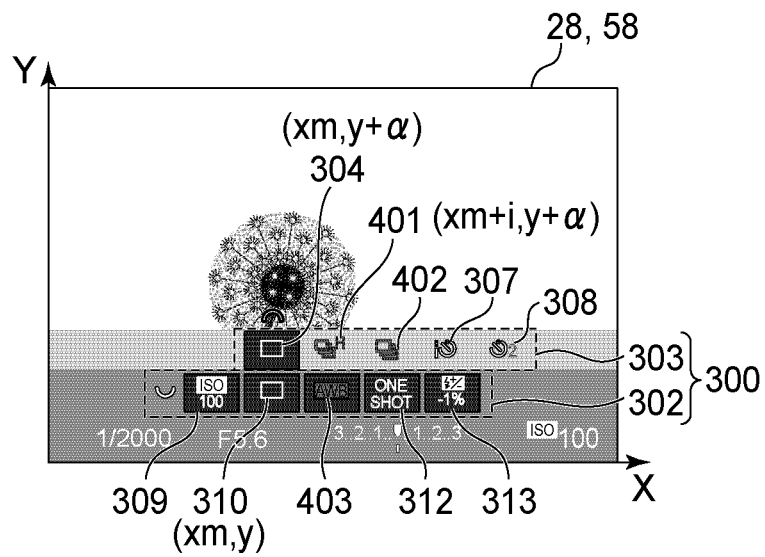
FIG. 4A is a diagram illustrating a display example of a setting screen in a case where a number of items are not settable according to the embodiment.
Figure 4B:
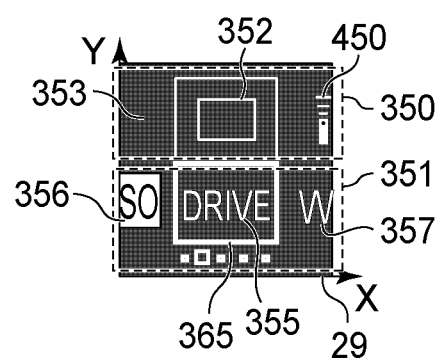
FIG. 4B is a diagram illustrating a display example of the setting screen in the case where a number of items are not settable according to the embodiment.
Figure 4C:
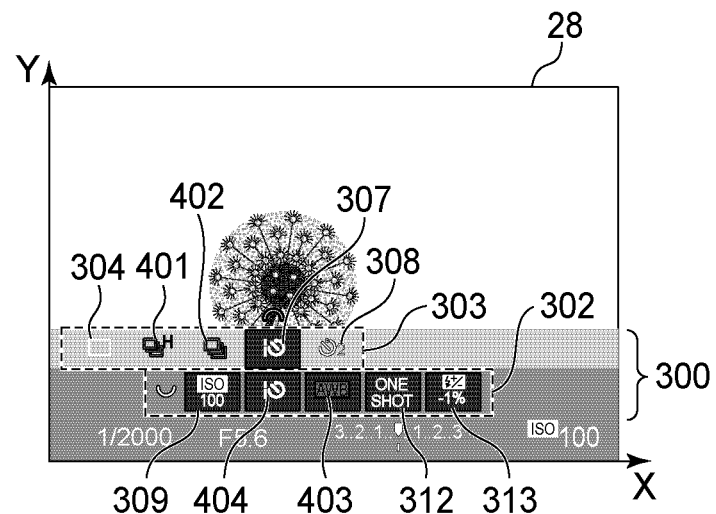
FIG. 4C is a diagram illustrating a display example of the setting screen in the case where a number of items are not settable according to the embodiment.
Figure 4D:
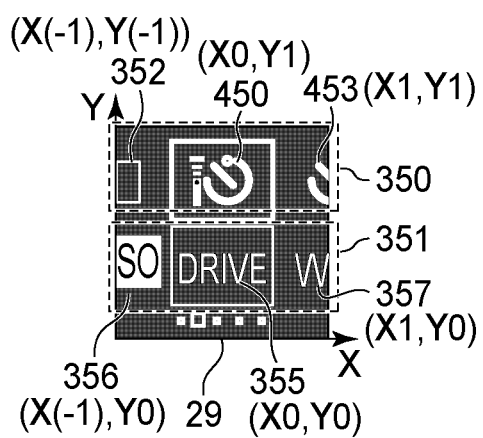
FIG. 4D is a diagram illustrating a display example of the setting screen in the case where a number of items are not settable according to the embodiment.
Figure 4E:
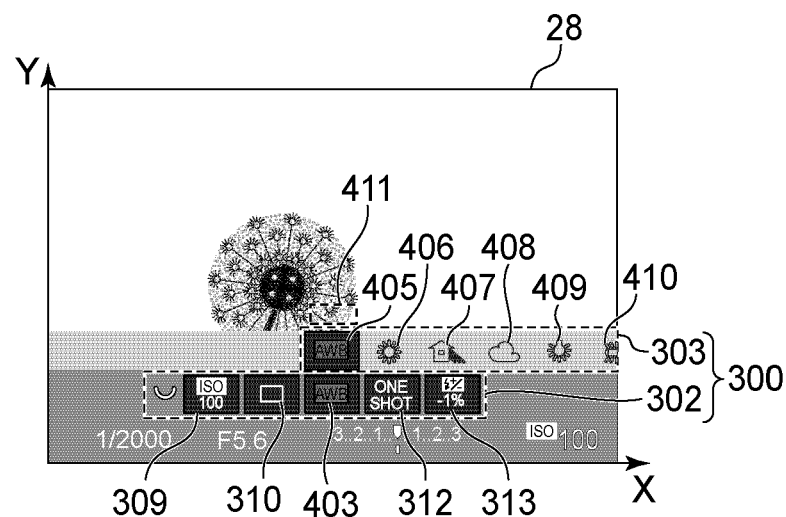
FIG. 4E is a diagram illustrating a display example of the setting screen in the case where a number of items are not settable according to the embodiment.
Figure 4F:
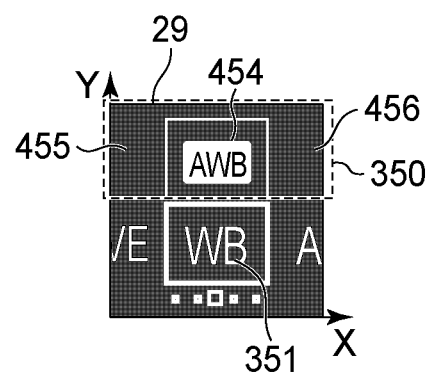
FIG. 4F is a diagram illustrating a display example of the setting screen in the case where a number of items are not settable according to the embodiment.

In step S612, the system controller 50 performs a setting for displaying the icon m of the setting value which is set as the setting item D=M in gray-out in the display section 28. When the determination is negative in step S610, the setting item is displayed in gray-out which indicates that the setting of the setting item may not be changed (identification available). Here, the icon indicating the setting item D=M is the icon m of the setting value being set. FIGS. 4A to 4F are diagrams illustrating display examples when an item in which a setting thereof may not be changed is included. FIGS. 4A, 4C, and 4E are diagrams of the display examples of the display section 28, and FIGS. 4B, 4D, and 4F are diagrams of the display examples of the upper surface display section 29. In FIG. 4E, the display example in a case where a setting of the white balance may not be changed is illustrated. An icon 403 (the white balance) corresponds to the selected setting item D=M, and icons 405 to 410 correspond to setting items M=i which are candidates of a setting value. The icon 405 indicates auto white balance, the icon 406 indicates sunlight, the icon 407 indicates sunshade, the icon 408 indicates a cloudy day, the icon 409 indicates a filament lamp, and the icon 410 indicates a white fluorescent lamp. Although setting values are further continued on a right side of the icon 410, only the setting values within limitation of display are displayed. The icon m indicating the set setting value corresponds to the icon 405, and therefore, the icon 405 indicating the setting value is displayed by gray-out in the icon 403 indicating the setting item D=M. In a function of automatically changing exposure and performing imaging a plurality of times, a setting of the white balance for a first imaging operation is maintained. Therefore, if the setting of the white balance for a first imaging operation is the auto white balance, the icon 403 indicating the white balance is grayed out in subsequent imaging operations in the display mode of the icon 405.

In the process in step S613 and step S614, the icon indicating the setting value selected as the setting value of the selected setting item is displayed in the display section 28 and the upper surface display section 29.

In step S613, the system controller 50 performs a setting for displaying the icon of the selected setting value M=m corresponding to the setting item D=M in a setting value display coordinate (xm, y+α) in the display section 28. As illustrated in the setting screen 300 of FIG. 3A, the icon 304 indicating the selected setting item M=m is displayed in the setting value display coordinate. An icon indicating a selected setting value is displayed in the setting value display coordinate. Since the parent item group 302 and the child item group 303 are displayed in parallel to each other, if an icon of a selected setting value and an icon of a setting item D are separated from each other or are not displayed in corresponding positions, a long distance of a shift of a line of sight is required, and therefore, the user may not recognize the relationship between the parent item layer and the child item layer. Furthermore, an icon of a setting item which is not selected and an icon of a selected setting value may be displayed close to each other or an icon of a selected setting value may be displayed immediately above an icon of one of the other setting items, and therefore, the user may mistakenly recognize a setting item and a setting value which are different from those in the setting. Furthermore, in a case where the user changes a selected setting item, a focus indicating a selected icon is also shifted, and therefore, it is highly likely that the user does not recognize whether the setting value is changed or the setting item is changed. If a position of display of a selected icon is shifted with a change of a setting item, focuses displayed in the icons are simultaneously shifted, and therefore, the user may more reliably recognize the changed setting item and a selected setting value. For example, when the selected setting item is shifted rightward by one in a focus state in FIG. 3A, a focus of the selected setting item and a focus of a selected setting value are shifted by one icon and a focus state illustrated in FIG. 3C is obtained.

In step S614, the system controller 50 performs a setting for displaying the icon m of the selected setting value M=m corresponding to the setting item D=M in a coordinate (X0, Y1) in the upper surface display section 29. In the setting screen 363 in the upper surface display section 29, a selected setting item and an icon indicating a setting value are displayed at the center, and therefore, a coordinate (X0, Y1) positioned immediately above the display position (X0, Y0) of the icon 355 indicating the setting item D=M is a display coordinate of the setting value.

In the process from step S615 to step S619, a setting for displaying icons indicating setting values in the child item group 303 in the display section 28 is performed.

In step S615, the system controller 50 determines whether a setting value M=i of a candidate of a setting value of the setting item D=M may be set. Each of the candidates of the setting values of the selected setting item except for the selected setting value is assigned to i of the setting value M=i. In step S615, the values M of 1 to I are individually subjected to the determination except for the selected setting value. Specifically, in the setting screen 300 of FIG. 4A, among the icon 304, an icon 401, an icon 402, the icon 307, and the icon 308, the icons except for the icon 304 indicating the selected setting value are set as i to be subjected to the determination one by one in step S615. The icons 401 and 402 indicate setting values which are not currently settable in the drive mode, and therefore, the determination is negative in step S615, and the icons 407 and 408 are settable setting values, and therefore, the determination is affirmative in step S615. In a case where a filter effect is set for automatically applying various effects on a captured image so that an image is generated, continuous shooting may not be set. Accordingly, in a case where the filter effect is set, among the icons 401, 402, 307, and 308, the determination is negative in step S615 in the case of the icons 401 and 402, and the determination is affirmative in step S615 in the case of the icons 307 and 308.

In step S616, the system controller 50 displays the icon i of the setting value M=i of a setting candidate in white in a coordinate (xm+i, y+α) in the display section 28. The X coordinate (xm+i) is obtained by adding the x coordinate xm of the selected setting value to a distance i between the icon of the selected setting value and each of the icons. In the setting screen 300 of FIG. 4A, as described in step S615, it is determined that the icon 307 is settable, and therefore, the icon 307 is displayed in white in a position shifted from the icon 304 by three icons. Here, i indicates a distance corresponding to three icons in the case of the icon 307 and a distance corresponding to four icons in the case of the icon 308. In this way, display coordinates of the individual icons i which are setting candidates are also changed depending on the selected setting value (which determines i) and a display position of the selected setting item (xm). Note that, also in the icon display in the child item group 303, display order of the icons is obtained as described in step S606 and the individual icons may be displayed in predetermined display positions of the icons.

In step S617, the system controller 50 displays the item i of the setting value M=i of the setting candidate in a coordinate (xm+1, y+α) in the display section 28 in gray-out. In the setting screen 300 of FIG. 4A, as described in step S615, it is determined that the icon 401 is not settable, and therefore, the icon 401 is displayed in gray-out in a position shifted by one icon from the position of the icon 304.

In step S618, the system controller 50 performs a process from step S615 to step S617 until a setting value M=I of the setting candidate and determines whether a display setting has been performed. When the determination is affirmative, the process proceeds to step S620, and otherwise, the process proceeds to step S619.

In step S619, the system controller 50 increments M=i by one so as to perform a determination of a setting value of a next setting candidate in step S615. Note that, although the description has been made in the case where i of 1 is set to a candidate of a setting value at a left end displayed in the display section 28 and is incremented rightward, the present disclosure is not limited to this.

In a process in step S620 and step S621, candidates of another setting value which is different from the setting value selected in the upper surface display section 29 are displayed. Unlike the display section 28, only two setting values in addition to the selected setting value are displayed in the upper surface display section 29 at maximum. Furthermore, since a display region is limited, entire icons of the setting values other than the selected setting values are not displayed but portions of the icons are displayed.

In step S620, the system controller 50 obtains selectable setting values before and after the setting value M=m which is being set in candidates M of the settable setting value. Specifically, the setting value M=m being set indicates the single shot denoted by the icon 304 in FIG. 3A, and therefore, a setting value before the setting value M=m does not exist and a setting value after the setting value M=m indicates high-speed continuous shooting denoted by the icon 305. Accordingly, in a case where the icon 304 is selected as illustrated in FIG. 3A, the high-speed continuous shooting is obtained in step S620. Furthermore, the setting value M=m being set indicates the self-timer of 10 seconds/remote control imaging indicated by the icon 307 in FIG. 4C, and therefore, a setting value before the icon 307 is the icon 402 which is not selectable.

Furthermore, the icon 401 before the icon 402 is also not selectable, and therefore, the single shot represented by the icon 304 which is positioned before the icon 401 and which is selectable is a setting value before the icon 307. After the icon 307, the self-timer of 2 seconds indicated by the icon 308 is positioned. Therefore, in a case where the icon 307 is selected as illustrated in FIG. 4C, the single shot and the self-timer of 2 seconds are obtained in step S620.

Furthermore, different processes are performed in step S620 depending on a result of a determination as to whether a setting of the currently-selected setting item is changeable. In a case where a setting of a setting item which is currently selected is changeable, setting values before and after the currently-selected setting item are obtained from among the candidates M of the settable setting value, and on the other hand, in a case where the setting of the setting item is not changeable, a setting value is not obtained. When it is determined that the setting of the currently-selected setting item is not changeable, a process in step S621 is not performed.

In step S621, the system controller 50 displays candidates of the setting values before and after the selected setting value which are obtained in step S620 in the upper surface display section 29. In step S620, the icon 305 is obtained as an item before or after the icon 304, and therefore, an icon 354 indicating the high-speed continuous shooting is displayed in a display coordinate (X1, Y1) which is in a right position of an item 352 indicating the selected setting value in a child item group 350 in FIG. 3B. In FIG. 3B, a candidate of a setting value before the selected setting value (a first setting value in display order) does not exist, and therefore, an icon indicating a setting value is not displayed in a region 353. In the child item group 350 in FIG. 4D, an icon 453 indicating the self-timer of 2 seconds which is a setting value after the selected setting value is displayed in a display coordinate (X1, Y1) in a position on a right side of an icon 450 indicating the selected setting value. Furthermore, an icon 352 indicating the single shot which is a setting value before the selected setting value is displayed in a display coordinate (X(−1), Y1) on a left side position. Although candidates of a setting value which are not settable are displayed in gray-out in the display section 28, only candidates of a settable setting value are displayed in the upper surface display section 29 since the display region is limited. As described above, in the upper surface display section 29, the selected setting value and only candidates of the setting value displayed on left and right sides of the setting value are displayed. Accordingly, if a setting value which is not selectable is displayed beside the selected setting value, the user may not view the other icons, and therefore, it is likely that the user mistakenly recognizes the viewable candidates of the setting value to be selectable. Therefore, in the upper surface display section 29, setting values which are not selectable are not displayed so that the user may reliably recognize candidates of a setting value to be selected next.

Furthermore, in a case where a setting of the selected item is not changeable, if display indicating the other setting values is performed in the upper surface display section 29, the user mistakenly recognizes that a setting may be changed, and therefore, such display is not performed. As illustrated in the child item group 350 of FIG. 4F, even though an icon 454 indicating the selected setting value is displayed, icons are not displayed in regions 455 and 456, and therefore, the user may recognize that the setting value is not changeable.

In a process from step S622 to step S627, an icon indicating a selectable setting item is displayed in the parent item group 302 of the display section 28.

In step S622, the system controller 50 determines whether a setting of a setting item D=N is changeable. There are setting items 1 to 5 at maximum. N is one of the setting items 1 to 5 at maximum, and in step S622, the determination is successively performed on all the setting items except for the selected setting item. A description will be made using the setting screen 300 of FIG. 4C. In the parent item group 302 of the setting screen 300 in FIG. 4C, a drive mode indicated by the icon 404 is selected. Therefore, in step S622, the determination is successively made on the ISO sensitivity indicated by the icon 309, the white balance indicated by the icon 403, the focus setting indicated by the icon 312, and the light modulation correction indicated by the icon 313 in this order. The ISO sensitivity is a setting item in which a setting thereof is currently changeable, and therefore, the determination is affirmative in step S622. On the other hand, the white balance is not a setting item in which a setting thereof is currently changeable, and therefore, the determination is negative in step S622. When the determination is affirmative in step S622, the process proceeds to step S623, and otherwise, the process proceeds to step S624.

In step S623, the system controller 50 performs a setting for displaying an icon indicating the setting value of the setting item D=N determined in step S622 in white in a display coordinate (xn, y) of the display section 28. In the parent item group 302 of the setting screen 300 in FIG. 4C, a setting item indicating the ISO sensitivity is displayed as the icon 309 in a display mode of an icon of ISO 100 (an icon n) indicating a setting value of current ISO sensitivity. In this way, since the setting item is displayed by an icon indicating the setting value, the user may recognize a list of setting values being set by viewing the parent item group 302, and therefore, setting values of a plurality of setting items may be quickly recognized in imaging. Furthermore, excellent operability is attained since setting values of other setting items may be checked in the parent item group 302 while an operation of setting a certain setting value is performed. A position xn of a display coordinate is determined based on display order of the setting items. In the five setting items, the setting item indicating the ISO sensitivity is displayed in a position of a left end in the parent item group 302 since the ISO sensitivity is a first setting item. The drive mode which is the setting item being selected set to be displayed in step S611 is a second setting item in the five setting items, and therefore, the drive mode is displayed in a second position from the left in the parent item group 302.

In step S624, the system controller 50 determines whether the setting item D=N is invalid. When the determination is negative in step S622 (No in S622) and the determination is affirmative in step S624, the setting item is not displayed. If some setting items are not displayed, the setting items are displayed close to each other. Specifically, in a case where one of the five setting items which is positioned in the middle is invalid, the four other items are displayed close to each other with an even interval. When the determination is affirmative in step S624, the process proceeds to step S626, and otherwise, the process proceeds to step S625.

In step S625, the system controller 50 performs a setting for displaying the icon indicating the setting value of the setting item D=N in gray-out in a display coordinate (xn, y). In the parent item group 302 of the setting screen 300 in FIG. 4C, the setting item indicating the white balance is displayed as the icon 403 in a display mode of an icon of auto white balance (AWB) (an icon n) indicating a setting value of current white balance. In this way, the setting item of the white balance is displayed in gray-out in the display mode of the AWB indicating the setting value, and therefore, the user may recognize a current setting value of the white balance, and in addition, the user may recognize that a setting of the setting value is not changeable from the AWB. In the case where the setting of the setting item D=N is not changeable, all the items are displayed in gray-out as illustrated in the child item group 303 of the setting screen 300 of FIG. 4E. Here, the icon 316 indicating the sub-electronic dial 72 is not displayed.

In step S626, the system controller 50 determines whether a display setting has been performed until the setting item of D=5. Note that, in a case where the number of setting items set in the parent item group 302 is not 5 but 3 or 4, it is determined whether a display setting for the setting item has been performed until D=3 or D=4. When the determination is affirmative, the process proceeds to step S628, and otherwise, the process proceeds to step S627.

In step S627, the system controller 50 performs a process from step S622 to step S625 on a next setting item by incrementing D=N by one.

In a process in step S628 and step S629, an icon indicating a selectable setting item is displayed in the parent item group 351 of the upper surface display section 29. Note that, although only icons indicating selectable setting values are displayed in the child item group 350 in the upper surface display section 29, icons indicating setting items are displayed in the parent item group 351 irrespective of whether a setting of a setting item is changeable.

In step S628, the system controller 50 obtains setting items before and after the setting item D=M being set in the items of the setting item D=N. As illustrated in FIG. 4C, in a case where the setting item of the drive mode is selected, setting items before and after the drive mode is the ISO sensitivity indicated by the icon 309 and the white balance indicated by the icon 403. Furthermore, in a case where the setting item of the white balance is selected as illustrated in FIG. 4E, setting items before and after the white balance are the drive mode indicated by the icon 310 and the focus setting indicated by the icon 312. Here, a setting of the setting item indicating the white balance is not changeable in FIG. 4C, and therefore, setting items before and after the selected setting item D=M are obtained in step S628 when display is performed on the upper surface display section 29.

In step S629, the system controller 50 performs a setting for displaying an item N of the setting item D=N before and after the setting item D=M being set obtained in step S628 in a display coordinate (X1, Y0) or (X(-1), Y0) in the upper surface display section 29. In the parent item group 351 in the upper surface display section 29, the setting item is displayed in a display mode indicating the setting item. Accordingly, although the ISO sensitivity is displayed as the icon 309 in the display section 28 as illustrated in FIG. 4C, the icon 356 is displayed in the display coordinate (X(-1), Y0) in the upper surface display section 29 as ISO representing the ISO sensitivity as illustrated in FIG. 4D. Furthermore, although the white balance is displayed as the icon 403 indicating a setting value in the display section 28 as illustrated in FIG. 4C, the icon 357 is displayed in the display coordinate (X1, Y0) in the upper surface display section 29 as WB representing the white balance as illustrated in FIG. 4D.

In step S630, the system controller 50 displays the icon set to be displayed in the process before step S629 in the display section 28 and the upper surface display section 29.

In step S631, the system controller 50 displays focuses on a setting item selected in the display section 28 and an icon indicating a setting value. In FIG. 3A, since the drive mode is selected as the setting item, an orange cursor 325 is displayed in the icon 310 indicating the drive mode. Furthermore, since the single shot is selected as the setting value of the drive mode, a black cursor 314 is displayed in the icon 304 indicating the single shot. As described below, according to this embodiment, settings in a parent layer (a setting item) and a child layer (a setting value) are changeable by different operation members. Accordingly, the orange cursor 325 is displayed in one of the layers in which a setting is currently changed (a setting is last changed), and a black cursor 314 is displayed in the other layer. In FIG. 3E, the item in which the setting thereof is currently changes is a setting value of the white balance in the child layer, and therefore, the cursor 314 is displayed in an icon 364 indicating the white balance and the cursor 325 is displayed in an icon 318 indicating sunlight which is a setting value of the white balance. Note that a display mode of the cursors 314 and 325 is not limited to that described above as long as the cursor 325 is more significant than the cursor 314. Furthermore, in step S631, a frame indicating a selected setting item and a setting value, such as a frame 349 in FIG. 3A is displayed. The frame 349 is displayed so as to surround the setting item and the setting value, and therefore, the user easily recognizes that the setting value in the frame has been set for the setting item. Furthermore, since the selected setting item is shifted to the frame 349, the selected setting value in candidates of the setting value may be easily recognized. Furthermore, an icon indicating an operation member is displayed. In FIG. 3A, an icon 315 indicates the sub-electronic dial 72 and an icon 316 indicates the main electronic dial 71, and settings in the individual layers may be changed by operating the respective operation members.

In step S632, the system controller 50 displays focuses on the selected setting item and the setting value in the upper surface display section 29. In FIG. 3B, since the drive mode is selected as the setting item, a cursor 365 of a thick line is displayed in an icon 355 indicating the drive mode. Furthermore, the single shot is selected as a setting value of the drive mode, and therefore, a cursor 366 of a thin line is displayed in an icon 352 indicating the single shot. Furthermore, a guide 358 is displayed in FIG. 3B. The guide 358 indicates a position of a setting item which is currently selected in the five setting items (the number of set setting items). In five squares which are aligned, a display mode of a second square from the left is different from those of the others. Specifically, the display mode indicates that the second item from the left is currently selected, and one item is displayed on a left side of the second item and three items are displayed on a right side of the second item.

As described above, according to the embodiment described above, the user may recognize the relationship between the selected setting item and the selected setting value with ease. A position where the selected setting value is displayed is changed in accordance with a display position of the setting item and the selected setting value is displayed immediately above the display position of the setting item, and therefore, the user may quickly recognize the setting value of the selected setting item. Furthermore, since the parent layer and the child layer are displayed in parallel, even if the parent layer and the child layer are superposed on the LV image, degradation of visibility of the LV image may be reduced. If the parent layer and the child layer intersect with each other, a center portion of the LF image may overlap with icons. However, since the parent layer and the child layer are displayed in a lower region in the LV image in parallel to each other, the center portion of the LV image does not overlap with any icon, and therefore, degradation of the visibility may be reduced.

Furthermore, in a case where the display region is large or limited, the operability may be improved when the user performs settings. In the case where the display region is large, a list of setting values being set may be viewed, the setting operation may be performed while setting values of the other setting items are checked. In the case where the display region is limited, the user may reliably recognize a setting item being set and only selectable setting values are displayed, and therefore, the user may recognize an item to be selected when a next selection operation is performed.

Figure 7A:
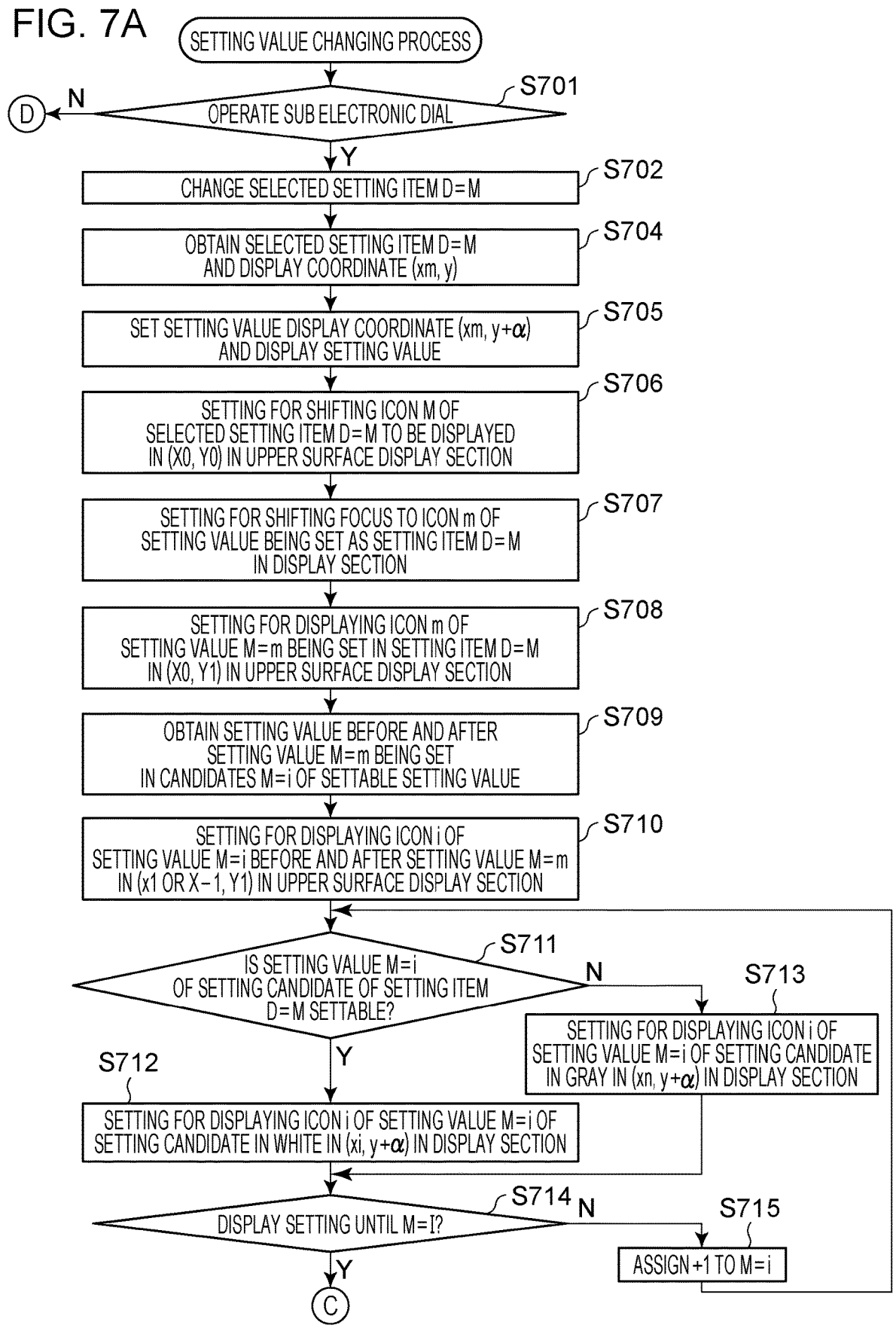
FIG. 7A is a flowchart of a setting value changing process according to the embodiment.
Figure 7B:
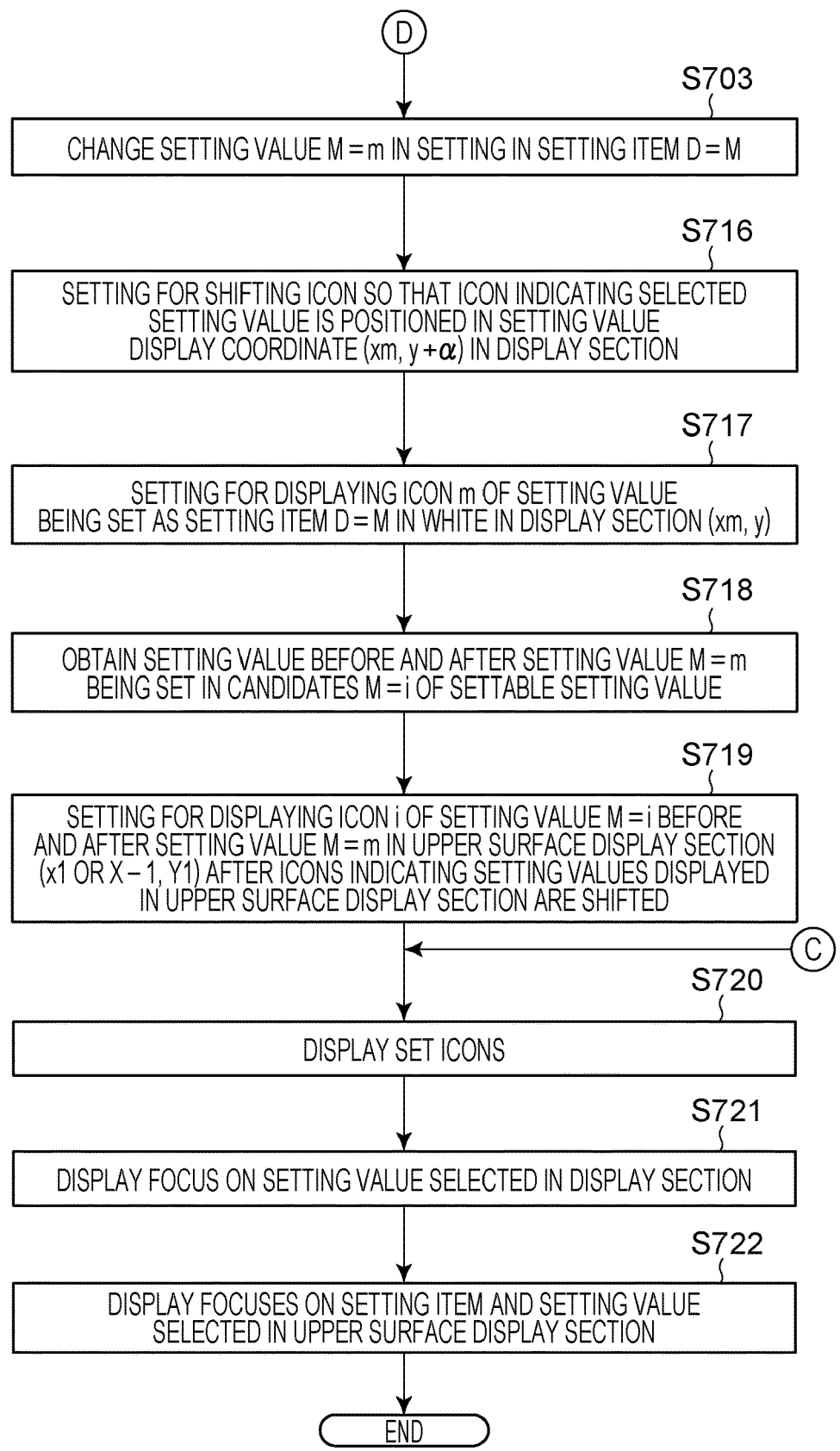
FIG. 7B is a flowchart of the setting value changing process according to the embodiment.

Next, a setting value changing process will be described with reference to FIGS. 7A and 7B. This process is realized when a program recorded in the nonvolatile memory 56 is developed in the system memory 52 and the system controller 50 executes the program. The setting value changing process is started when the process proceeds to step S510 in FIG. 5. Although a case where display in the display section 28 and the upper surface display section 29 is described as an example in the embodiment below, the display may be performed on the in-finder display section 58 instead of the display section 28.

In step S701, the system controller 50 determines whether the sub-electronic dial 72 has been operated in the operation determined in step S509. When the determination is affirmative, the process proceeds to step S702, and otherwise, the process proceeds to step S703. In step S702, a process of changing a setting item is performed. On the other hand, when it is determined that the main electronic dial 71 has been operated instead of the sub-electronic dial 72 in step S701, the setting value changing process is performed.

A process from step S702 to step S717 is performed when a setting item is changed. A setting is performed such that a cursor is moved to the selected setting item in the display section 28, and on the other hand, a setting is performed such that scrolling is performed so that the selected setting item is moved to a center position in the upper surface display section 29. Furthermore, a process of changing a displayed setting item is performed in accordance with a change of a setting item.

In step S702, the system controller 50 changes the selected setting item D=M. Although the drive mode is selected as the setting item in FIG. 3A, the white balance is selected as the setting item as illustrated in FIG. 3C when the sub-electronic dial 72 is rotated in this state. The changed setting item is recorded in the system memory 52 as D=M. When the sub-electronic dial 72 is rotated rightward, a setting item currently selected is switched to a setting item positioned on a right side of the currently-selected setting item, whereas when the sub-electronic dial 72 is rotated leftward, the currently-selected setting item is switched to a setting item positioned on a left side. Furthermore, when a setting item of a left end or a right end is selected and the sub-electronic dial 72 is rotated leftward or rightward, switching is not performed since an icon is not arranged any more.

In step S703, the system controller 50 changes the setting value M=m being set corresponding to the setting item D=M. In a case where the auto white balance indicated by an icon 317 is selected as a setting value of the white balance as illustrated in FIG. 3C, when an operation of changing the setting value is performed, the setting value is changed to sunlight. In icons in a child item group illustrated in FIG. 3C, the icon 317 indicate the auto white balance, an icon 318 indicates the sunlight, an icon 319 indicates sunshade, an icon 320 indicates a cloudy day, an icon 321 indicates a filament lamp, and an icon 322 indicates a white fluorescent lamp.

Figure 6A:
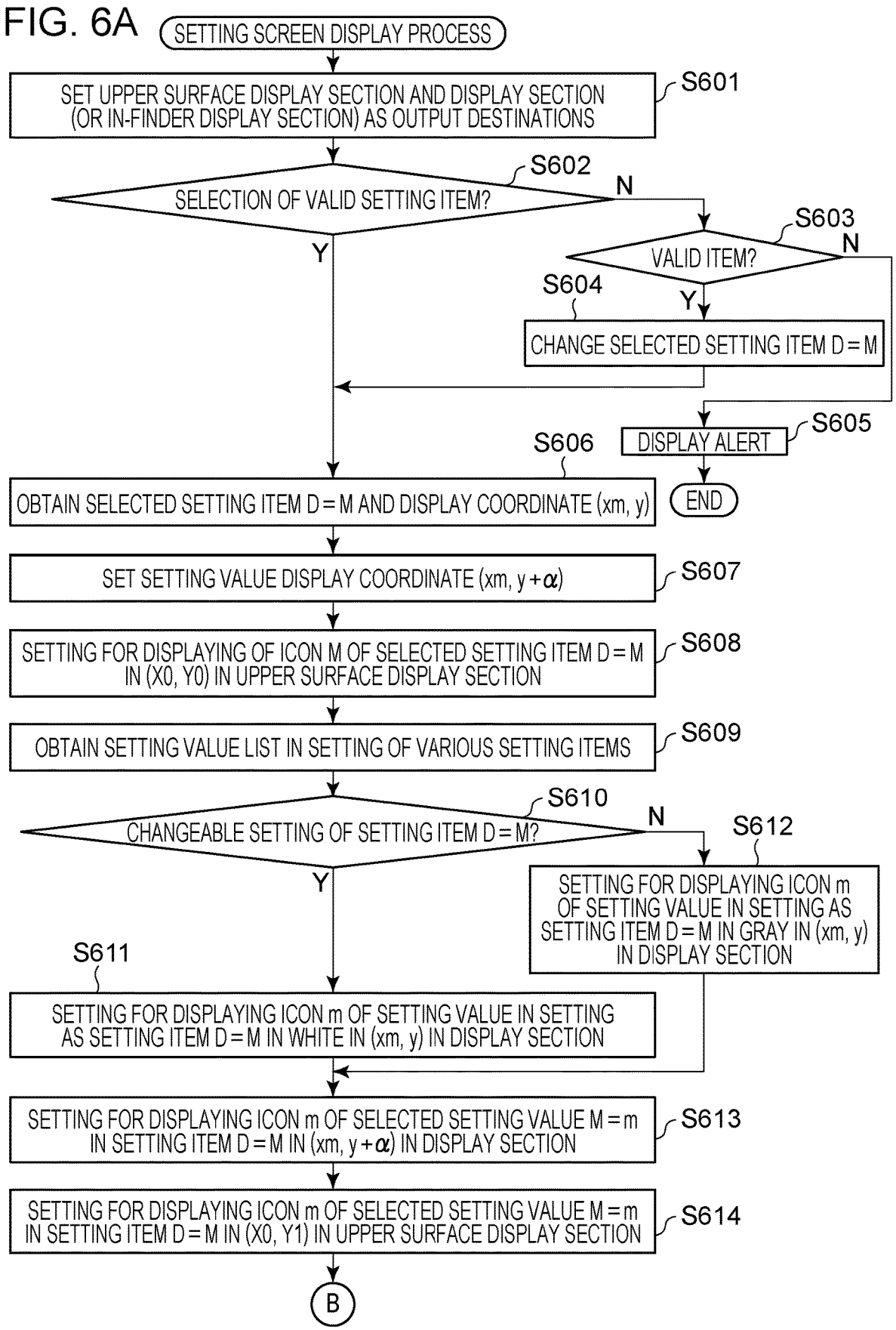
FIG. 6A is a flowchart of a setting screen display process according to the embodiment.

The process in step S704 and step S705 is the same as that performed in step S606 and step S607 of FIG. 6A. In step S704 and step S705, a display coordinate of the setting item D=M changed in step S702 is obtained and a setting value display coordinate which is a position where the setting value of the setting item D=M is to be displayed is set. Furthermore, in step S705, the selected setting value of the selected setting item D=M is displayed in the setting value display coordinate.

In step S706, the system controller 50 moves (scrolls) an icon displayed in the parent item group 351 such that the icon M of the selected setting item D=M is displayed in the display coordinate (X0, Y0) in which the selected setting item is displayed in the upper surface display section 29. When the selected setting item is switched from the drive mode to the white balance, a state in which the icon 355 is displayed in the coordinate (X0, Y0) as illustrated in FIG. 3B to a state in which the icon 357 is displayed in the coordinate (X0, Y0) as illustrated in FIG. 3D. Specifically, a setting is performed such that the icon 351 is shifted from the right end to the center, the icon 355 is shifted from the center to the left end, and the icon 362 (indicating the focus setting) is displayed at the right end.

In step S707, the system controller 50 performs a setting of shifting a focus to the selected setting item D=M in the display section 28. In the display section 28, all selectable setting items are displayed, and an item line is not shifted even if one of the setting items is selected. If one of the setting items is selected and the selected setting item is shifted to a certain position, such as a center portion or an end portion, a number of the plurality of setting items may not be displayed. Therefore, in the display section 28, only the focuses are shifted but the setting items are not shifted. In FIG. 3A, although the cursor 325 is assigned to the icon 310, if the white balance is selected as the setting item, the cursor 325 is shifted to the item 311 as illustrated in FIG. 3C.

A process in step S708 is the same as that in step S614 in FIG. 6A, and a setting value of the selected setting item is displayed in a center position of the child item group 350 in the upper surface display section 29.

Figure 6B:
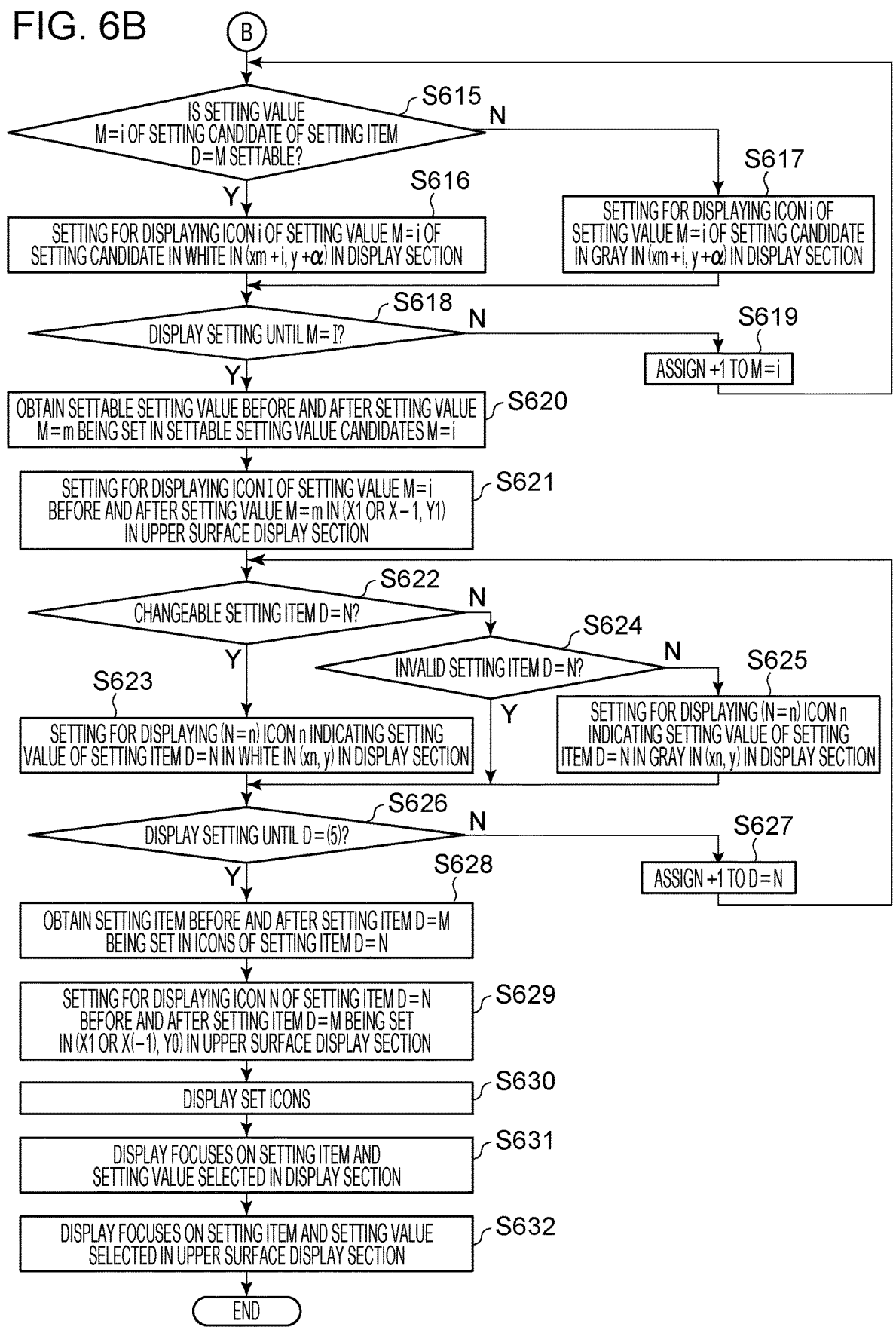
FIG. 6B is a flowchart of the setting screen display process according to the embodiment.

A process in step S709 and step S710 is the same as that performed in step S620 and step S621 in FIG. 6B.

A process in step S711 to step S715 is the same as that performed in step S615 and step S619 of FIG. 6B. After the selected setting item is changed and the setting value to be displayed is also changed, a process of displaying candidates of a setting value to be displayed in the child item group is performed.

Specifically, in a case where the drive mode is selected as a setting item as illustrated in FIG. 3A, when the setting item is changed, display of the setting item D=M and display of a setting item are changed in the display section 28 and the upper surface display section 29. As for the setting value display coordinate, a display position of an icon indicating the selected setting value is changed to a position where the icon 317 is displayed in FIG. 3C from a position where the icon 304 is displayed in FIG. 3A. An icon of the selected setting value is displayed as the setting item D=M in the display section 28, and an icon of the setting item is displayed as the setting item D=M in the upper surface display section 29.

A process from step S716 to step S718 is performed when the selected setting value is changed, and in the display section 28, the icon indicating the selected setting value is scrolled to the setting value display coordinate. Even in the upper surface display section 29, the icon indicating the selected setting value is scrolled to the center position of the child item group 350.

In step S716, the system controller 50 performs a setting such that an icon indicating a setting value is shifted to the setting value display coordinate (xm, y+a) of the display section 28. In FIG. 3C, the auto white balance is selected as a setting of the white balance, and the icon 317 is displayed in the setting value display coordinate. When the setting value is changed from the auto white balance to the sunlight, the icon 318 indicating the sunlight is shifted to be displayed in the setting value display coordinate. Specifically, the icons are moved (scrolled or shifted) by one icon from a state of the icons 317 to 322 illustrated in FIG. 3C to a state of the icons 317 to 322 illustrated in FIG. 3E. Since icons indicating all the setting values are not displayed in the child item group 303, a new icon, such as an icon 323, may be displayed by scrolling.

In step S717, the system controller 50 changes a display mode of an icon displayed in the parent item group 302 in the display section 28 as an icon indicating the setting item D=M. In the display section 28, a setting item is displayed by an icon indicating a current setting value. Therefore, the display mode of the icon indicating the setting item D=M is changed when the setting value is changed by rotation of the main electronic dial 71. In other words, an icon indicating a setting value changed in white is displayed in a position of a coordinate (xm, y) of the display section 28. In the parent item group 302 of FIG. 3C, the icon 311 indicating the auto white balance is displayed as the selected setting item. When the icon 317 (the auto white balance) is changed to the icon 318 (the sunlight), the icon 364 indicating the sunlight of FIG. 3E is displayed as an icon indicating the setting item of the white balance.

A process in step S718 is the same as that performed in step S620 of FIG. 6B.

In step S719, the system controller 50 shifts the icons in the child item group 350 such that an icon indicating the selected setting value is displayed in a center position of the child item group 350 of the upper surface display section 29, that is, a coordinate (X0, Y1). Furthermore, the icons are shifted such that an icon of a setting value M=i before and after the selected setting value M=m obtained in step S720 is displayed in a coordinate (X(−1), Y1) or a coordinate (X1, Y1) in the upper surface display section 29.

In step S720, the system controller 50 displays the icon set for display in the process before step S719 in the display section 28 and the upper surface display section 29. When a shift setting has been performed, the icons are shifted (scrolled).

In step S721, the system controller 50 displays a focus on an icon indicating a selected setting value in the display section 28.

In step S722, the system controller 50 displays focuses on the selected setting item and the setting value in the upper surface display section 29. Note that the display of the focuses may be performed simultaneously with the display of the icons, and the icons may be shifted to a focus position while the focuses are displayed.

As described above, according to the described embodiment, visibility of the user is improved when a setting is changed. Focus positions of the setting item and the setting value are the same when the selected setting item is changed, and therefore, the user similarly shifts a line of sight in the setting items and the setting values. Accordingly, the possibility that one of the setting item and the setting value which has been subjected to the focus shift (change) is not recognized is reduced. Furthermore, even when the selected setting item is changed, the selected setting item is not shifted in the display section 28, whereas when the selected setting value is changed, the setting value is shifted to a position corresponding to the selected setting item. Accordingly, since the setting item is not shifted, a portion of the setting item is not brought into a non-display state, and the user may check a list of the setting values being set any time. Furthermore, since the selected setting value is shifted to a fixed position, the selected setting value is easily recognized.

Furthermore, according to the described embodiment, the user may perform a setting change with high visibility irrespective of a size of the display region. In the display section 28 having the large display region, since an icon indicating a setting value is displayed as a setting item, the user may perform a setting operation or imaging while viewing the list of the setting values. On the other hand, in the upper surface display section 29 having the limited display region, the setting item being set may be reliably recognized by the user. In the upper surface display section 29, if an icon indicating the setting item is displayed by an icon of a selected setting value similarly to the display section 28, two icons in the same display mode and a portion of an icon indicating a candidate of another setting value are displayed. In this case, if the user does not remember a display mode of a setting value which is included in the setting item, it is highly likely that the user does not remember a setting item which is currently set. On the other hand, in the case of the display section 28, at least the two icons are completely displayed which are candidates of the setting item, in addition to the selected setting item, and therefore, it is highly likely that the user recognizes a setting item being set in the list of the setting items. In the upper surface display section 29, the list of the setting items may not be displayed or even if the list is displayed, the displayed list is small. Therefore, operability is improved when the setting items are displayed in a display mode in which the setting items themselves are displayed.

In the display section 28, the individual icons of the setting items are not brought into a non-display state. However, the icons of the setting values are not displayed depending on the setting value display coordinates and positions of the selected setting values. However, the icon of the setting item is displayed in a center region of the display section 28, and therefore, margin for two items remain at left and right ends. Accordingly, if a setting item of a left end or a right end is selected and a setting value of a right end or a left end in the setting values is further selected, at least three candidates of the setting item are displayed. In this way, by displaying icons, difficulty of recognition of other candidates of a setting value which occurs when a display position of an icon of a selected setting value is changed depending on a setting item is reduced.

Note that a display destination is not limited to the display section 28 and the in-finder display section 58 and may be an outside of the apparatus.

Figure 8A:
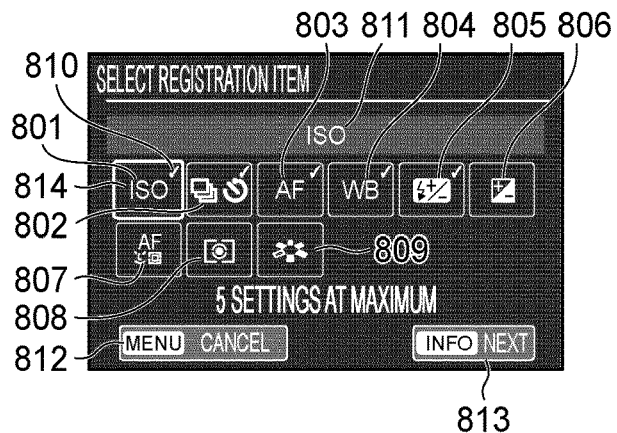
FIG. 8A is a diagram illustrating an example of display of a customizing screen according to the embodiment.

A setting of a setting item to be displayed in the setting screen according to this embodiment will be described with reference to FIGS. 8A to 8F. FIGS. 8A to 8F are diagrams illustrating screens for selecting and rearranging setting items to be displayed in the setting screen. The screen in FIG. 8A is displayed in the display section 28 when an item associated with the setting screen is selected in the menu screen.

In FIG. 8A, a setting item 801 indicates the ISO sensitivity, a setting item 802 indicates the drive mode, and a setting item 803 indicates the AF operation. A setting item 804 indicates the white balance, a setting item 805 indicates the light modulation correction, and a setting item 806 indicates the exposure correction. A setting item 807 indicates an AF method, a setting item 808 indicates a photometric mode, and a setting item 809 indicates a picture style. A check 810 indicates a setting item selected by the user from among the setting items 801 to 809. In this embodiment, the number of selectable setting items is 5 at maximum. However, the number of selectable setting items may be changed depending on a size of a display destination. A focus 814 indicates a position currently selected, and when the SET button 73 is pressed in a focused state, the focused item may be selected. An icon 811 indicates an item name, an icon 812 indicates that a setting is cancelled when a menu button is pressed, and an icon 813 indicates that a next process is entered when an INFO button is pressed.

Figure 8B:
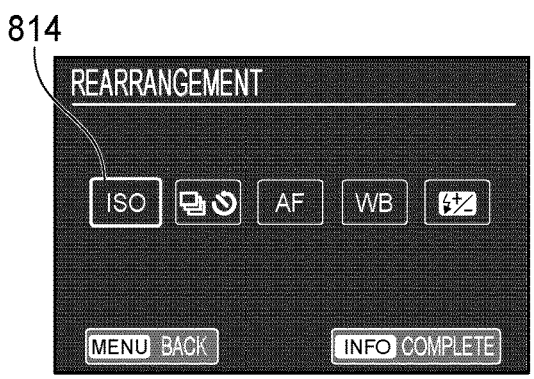
FIG. 8B is a diagram illustrating an example of display of the customizing screen according to the embodiment.
Figure 8C:
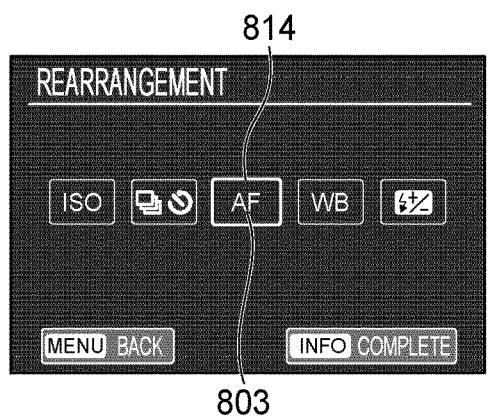
FIG. 8C is a diagram illustrating an example of display of the customizing screen according to the embodiment.
Figure 8D:
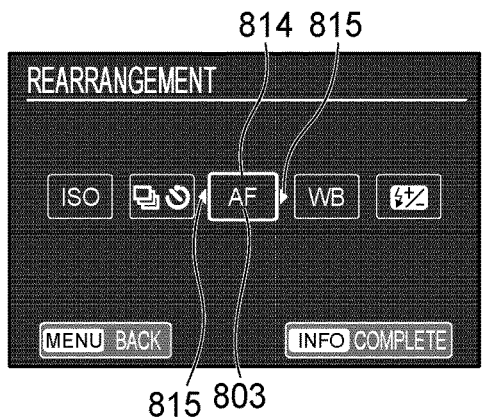
FIG. 8D is a diagram illustrating an example of display of the customizing screen according to the embodiment.
Figure 8E:
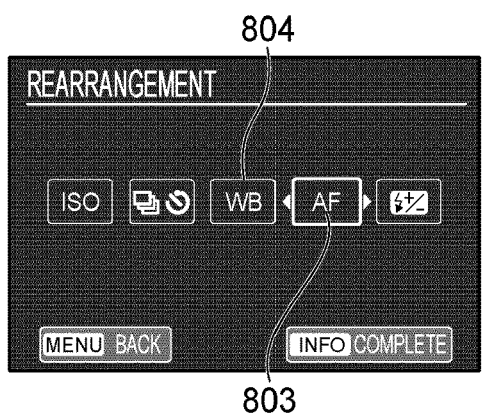
FIG. 8E is a diagram illustrating an example of display of the customizing screen according to the embodiment.
Figure 8F:
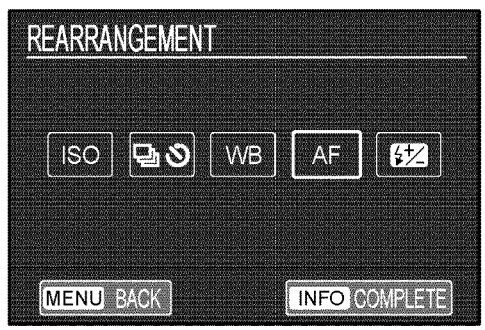
FIG. 8F is a diagram illustrating an example of display of the customizing screen according to the embodiment.

In FIG. 8B, the icons indicating the setting items selected in FIG. 8A are displayed. Here, a focus 814 is shifted to the setting item 803 as illustrated in FIG. 8C, and in this state, when the SET button 73 is pressed, the setting item 803 may be selected. When the setting item 803 is selected, arrow marks 815 are displayed beside the icon 803 as illustrated in FIG. 8D. In this state, when a right key 74*d* in the arrow key 74 is pressed, the icon 803 is shifted rightward. FIG. 8E is a diagram illustrating a state in which the icon 803 is shifted rightward by one icon and a display position of the setting item 803 and a display position of the setting item 804 are exchanged. In this state, when the SET button 73 is pressed, the rearrangement of the icon 803 is completed as illustrated in FIG. 8F, and furthermore, when the INFO button is pressed, the rearrangement operation is terminated. In this way, the user selects a setting item to be displayed in the setting screen and may further rearrange the setting item. The user may sensuously recognize a position of a desired setting item by performing the rearrangement, and recognizes that a setting item which is set at a right end may be quickly selected by swiftly rotating the sub-electronic dial 72 rightward. Furthermore, the user recognizes that a second item from the right may be quickly selected by swiftly rotating the sub-electronic dial 72 rightward and thereafter returning the sub-electronic dial 72 leftward by one icon. The individual setting items are stored in the system memory 52 as items 1 to 5 from the left and the determination in step S622 of FIG. 6B and the like is performed starting from the item 1.

Figure 9A:
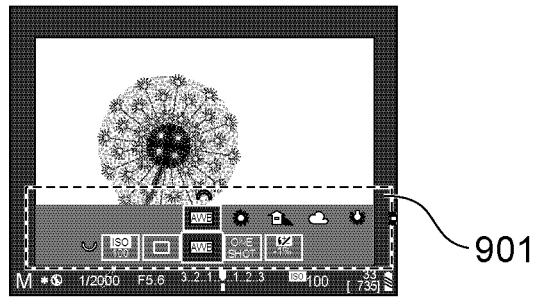
FIG. 9A is a diagram illustrating another display example according to the embodiment.
Figure 9B:
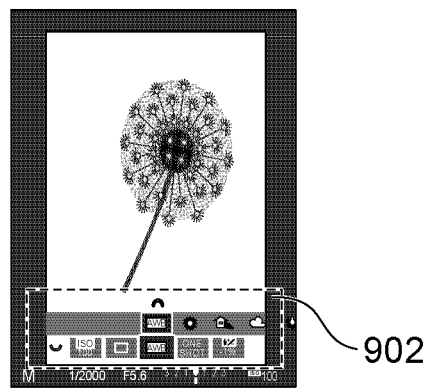
FIG. 9B is a diagram illustrating still another display example according to the embodiment.

Next, another display example will be described with reference to FIGS. 9A to 9E. FIGS. 9A and 9B are diagrams illustrating display examples of a setting screen in the in-finder display section 58 and are used to describe that display is changed depending on an inclination of the digital still camera 100. In FIG. 9A, the digital still camera 100 is in a horizontal state, and in FIG. 9B, the digital still camera 100 is in a vertical state (rotated by 90 degrees from the horizontal state and aspect ratios are different from each other). The setting screen is displayed along a lower side of the display region in FIGS. 9A and 9B. A setting screen 901 in FIG. 9A has a display region which is horizontally long, and therefore, all the setting items are displayed large. However, a setting screen 902 in FIG. 9B has a display region which is vertically long, and therefore, the setting items are displayed smaller than those in the setting screen 901. Furthermore, a width for displaying candidates of a setting value is small, and therefore, even if the same setting item and the same setting value are selected, the number of candidates of selectable setting value which are displayed is smaller in the setting screen 902. Note that, in a case where the display region is vertically long, the icons may be displayed along a longitudinal side.

Figure 9C:
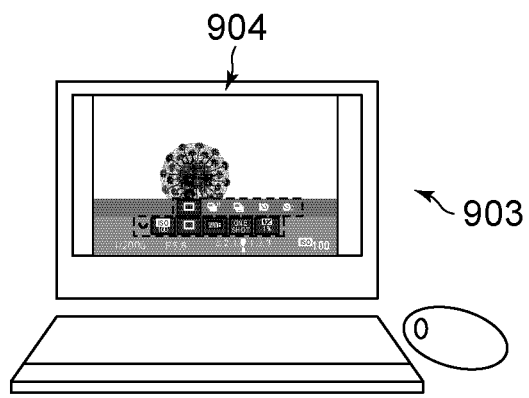
FIG. 9C is a diagram illustrating a further display example according to the embodiment.

FIG. 9C is a diagram illustrating a case where this embodiment is applied to a personal computer (PC). The setting screen may be displayed instead of the display section 28 when the digital still camera 100 and a personal computer 903 are connected to each other through the communication unit 54 in a wireless manner or a wired manner. Furthermore, list display for displaying all the setting items (FIG. 3A, for example) and partial display for displaying a number of the setting items (FIG. 3B, for example) may be switched from one to another depending on a size of an operation region. In a case where an entire display region of the personal computer 903 is a current operation region, a list of the setting items are displayed as illustrated in FIG. 9C, whereas in a case where an operation is performed in a small display region which is a portion on the screen of the personal computer 903, the partial display is performed as illustrated in FIG. 3B. A determination as to whether the list display or the partial display is selected may be made depending on a result of a determination as to whether the display region has a width for displaying the list of the setting items having a size visually recognizable by the user. For example, in a smartphone, a tablet, or the like, if an image (a reproduction image) is edited by applying an effect or by changing a size, the list display is performed. Furthermore, in a case where a plurality of images are displayed and a selection of an image and edit of an image are simultaneously performed, the partial display is performed. Moreover, in a case where display for accepting an operation different from that performed on an operation screen in a background, such as a change in brightness of the screen, volume, or a setting mode, is temporarily performed in a translucent manner on a portion of the operation screen in the background in a superposed manner, the partial display may be performed. In a case where the setting screen for performing the change in brightness of the screen, volume, or a setting mode is displayed on the entire display region, the list display is performed.

Furthermore, according to the foregoing embodiment, although the setting screen is illustrated in FIGS. 3A to 3G and FIGS. 4A to 4F (referred to as a simple setting screen for discrimination), other types of setting screen may be displayed in a live-view screen of the digital still camera 100.

Figure 9D:
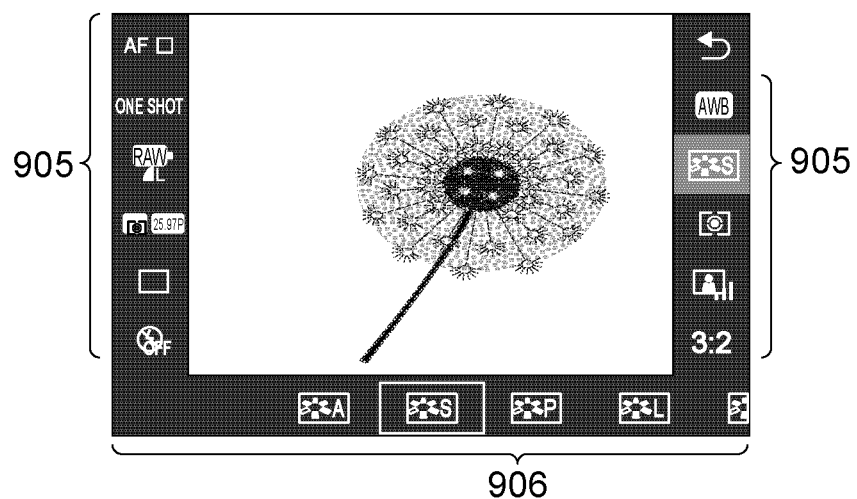
FIG. 9D is a diagram illustrating a still further display example according to the embodiment.
Figure 9E:
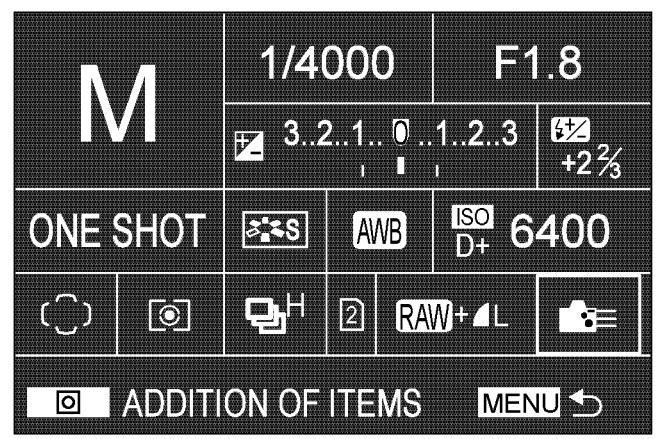
FIG. 9E is a diagram illustrating a yet further display example according to the embodiment.

FIG. 9D is a diagram illustrating a U-shape setting screen, and FIG. 9E is a diagram illustrating a quick setting screen. The U-shape setting screen of FIG. 9D is displayed when the SET button 73 is pressed in a state in which an LV image is displayed in step S501 of FIG. 5. In the U-shape setting screen, setting items to be displayed and display positions may be customized. In the U-shape setting screen, the number of settable setting items is larger than that in the simple setting screen, and 11 setting items may be set at maximum. The setting items are displayed in a region 905, and selected setting items are displayed in a region 906. The U-shape setting screen may set a larger number of settable setting items and is used when settings for imaging is performed in more detail than the simple setting screen. Therefore, the number of regions in which the setting items and icons indicating the setting values are superposed on the LV image is increased. In the U-shape setting screen, the setting items and the setting values are not displayed in parallel unlike the simple setting screen since perspicuity of a larger number of setting items is emphasized. The user may select one of the simple setting screen and the U-shape setting screen depending on a situation as a screen for a setting change while viewing the LV image. The U-shape setting screen may be or may not be displayed on the upper surface display section 29.

The quick setting screen illustrated in FIG. 9E is displayed when a quick button, not illustrated, is pressed in a state in which the LV image is displayed. In the quick setting screen, setting items to be displayed and sizes and display positions of icons corresponding to the setting items may be customized. The quick setting screen is not superposed on the LV image and is used when imaging items are more specifically set than the U-shape setting screen. In the quick setting screen, a setting value may be changed when a cursor is applied to one of the setting items and the main electronic dial 71 is rotated. The sub-electronic dial 72 is used to move the cursor. In a case where a setting value is to be changed using the main electronic dial 71, candidates of the setting value are not displayed but a display mode of each of the setting items is changed. Alternatively, a list of candidates of a setting value may be displayed by displaying a child layer. An imaging mode may be changed in the quick setting screen. Note that a number of items in the quick setting screen are simply displayed in the upper surface display section 29.

As described above, a plurality of setting screens are employed, and the simple setting screen is suitable for quickly changing a setting value in an interval between imaging operations, whereas the U-shape setting screen is suitable for setting details during an imaging operation. Furthermore, a setting may be changed including the imaging mode in the quick setting screen. In the simple setting screen, the user may more quickly set a setting item and a setting value without confusion.

Note that, although the ISO sensitivity and the white balance are taken as examples of the setting item in the foregoing embodiment, the present disclosure is not limited to these and the present disclosure is applicable to an editing screen for applying image effects including generation of a monotone image and emphasis of colors. Furthermore, the present disclosure is applicable to an editing screen for a moving image and audio and various setting screens.

Furthermore, in the foregoing embodiment, the parent item group and the child item group are arranged along the X axis in parallel to each other, and the child item group is displayed in the Y direction relative to the parent item group. However, the positional relationship between regions which displays the parent item group and the child item group is not limited to this as long as the parent item group and the child item group do not intersect with each other, and the child item group may be displayed below the parent item group.

Furthermore, although the main electronic dial 71 and the sub-electronic dial 72 are described as the operation unit, the operation unit is not limited to these and an input may be made by a touch operation, a pointer, or the like. When the touch operation is performed, scrolling is performed until a selected item in the child item group is shifted to a position of a selected parent item. Operations may be accepted from a plurality of operation members, such as a touch operation, a dial operation, and a mouse operation. In the case of a touch operation, an item to be selected is determined depending on whether a touch start position is a parent item or a child item, and unlike a dial, different operation members are not used in the parent layer and the child layer. Specifically, Touch-Down is performed on an item in the child item group and the item is selected when the touch is released. Similarly, Touch-Down is performed on an item in the parent item group and the item is selected when the touch is released. An item may be selected by, after Touch-Down on the item in the child item group, moving the item to the setting value display coordinate by Touch-Move.

Furthermore, in addition to the live-view screen, text or a map may be displayed in the background of the setting screen. If text is displayed, one of a size, a type, a color, and a display setting of the text which are setting items (in the parent layer) is selected. Furthermore, if the size of text is selected, one of sizes (in the child layer) is selected. When the map is selected, one of a place name, a shop name, and an address is selected as a setting item and a place desired by the user is selected from among a gas station, a cafe, a temple, and the like.

Note that the various control operations described above which are performed by the system controller 50 may be performed by a single hardware section, or the entire apparatus may be controlled by sharing processes by a plurality of hardware sections (including a plurality of processors and circuits, for example). Moreover, each of the processes in the blocks in FIG. 2 may be performed by a single hardware section or a plurality of hardware sections.

Furthermore, although the preferred embodiments of the present disclosure are described in detail, the present disclosure is not limited to the specific embodiments, and various modes are included in the present disclosure without departing from the scope of the present disclosure. Furthermore, the foregoing embodiments are merely examples of the present disclosure and the embodiments may be combined where appropriate.

Furthermore, although the present disclosure is applied to the digital still camera 100 in the foregoing embodiments, the present disclosure is not limited to this and may be applicable to electronic apparatuses capable of controlling display of items. Furthermore, the present disclosure is applicable to electronic apparatuses capable of controlling display of items in a display destination having different sizes of a display region. Specifically, the present disclosure is applicable to cellular phone terminals, mobile image viewers, printer apparatuses having a finder, digital photo frames, music players, game machines, projection apparatuses, electronic book readers, home electronics, and apparatuses having a display surface.

Other Embodiments

The present disclosure is also realized by executing the following process. Specifically, software (programs) which realizes the functions of the foregoing embodiments is supplied to a system or an apparatus through a network or various types of recording medium, and a computer (or a central processing unit (CPU), a micro processing unit (MPU), or the like) of the system or the apparatus reads and executes program codes. In this case, the programs and the recording medium which stores the programs are included in the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus, comprising:
    a first operation member;
    a second operation member different from the first operation member; and
    at least one memory and at least one processor which function as:
        a first selection unit configured to select one of a plurality of items included in a first layer in response to an operation on the first operation member;
        a second selection unit configured to select one of a plurality of items included in a second layer in response to an operation on the second operation member, the plurality of items included in the second layer becoming selectable as a result of selection of an item among the plurality of items included in the first layer; and
        a display control unit configured to perform control to arrange, and display on a first display, the plurality of items included in the first layer in a first direction and arrange, and display on the first display, the plurality of items included in the second layer in the first direction such that the item that is currently selected among the plurality of items included in the first layer and the item that is currently selected among the plurality of items included in the second layer are arranged and displayed adjacent to each other in a second direction orthogonal to the first direction,
    wherein the display control unit does not change display positions of the plurality of items included in the first layer even when the selected item in the first layer is changed to another item by an operation on the first operation member, and, in response to a change of the selected item in the second layer to another item by an operation on the second operation member, the display control unit changes display positions of the plurality of items included in the second layer such that the selected item in the second layer after the change comes to a position adjacent in the second direction to a display position of the selected item in the first layer and, in addition, displays a setting content of the selected item in the second layer in a display region of the selected item in the first layer,
    wherein, after the selected item in the second layer is changed in response to an operation on the second operation member, the selected item in the first layer is changeable in response to an operation on the first operation member, and
    wherein, each time the selected item in the first layer is changed to another item in response to an operation on the first operation member, the display control unit performs control to change display of the selected item in the first layer displayed on the first display to display of the selected item in the second layer and arrange and display the selected item in the first layer and the selected item in the second layer adjacent to each other in the second direction.

2. The electronic apparatus according to claim 1, wherein the display controller performs control such that a cursor is displayed in the selected item selected from among the plurality of items in the first layer and changes an item in which the cursor is displayed without changing display positions of the plurality of items in the first layer when the first selection unit changes the selected item in the first layer.

3. The electronic apparatus according to claim 2, wherein the display controller performs control such that a cursor is displayed in the selected item selected from among the plurality of items in the second layer which are displayed in the display unit and shifts display positions of the plurality of items in the second layer in the first direction so that a display position of a selected item in which the cursor is displayed is not changed when the second selection unit changes the selected item in the second layer.

4. The electronic apparatus according to claim 1,
    wherein the display controller performs control such that a cursor is displayed in the selected item selected from among the plurality of items in the first layer and a cursor is displayed in the selected item selected from among the plurality of items in the second layer displayed in the display unit, and
    wherein the cursor on the selected item in the first layer and the cursor on the selected item in the second layer are displayed in different forms so that a selected item which has most lately changed is identified.

5. The electronic apparatus according to claim 1,
    wherein the first selection unit changes the selected item in the first layer in accordance with a rotation operation performed on a first dial that is the first operation member, and
    wherein the second selection unit changes the selected item in the second layer in accordance with a rotation operation performed on a second dial that is the second operation member.

6. The electronic apparatus according to claim 1, further comprising:
    an imaging unit configured to capture an image,
    wherein the plurality of items in the first layer are settable when the imaging unit captures an image, and the plurality of items in the second layer are settable for the individual setting items.

7. The electronic apparatus according to claim 6, further comprising:
    a mode setting unit configured to set imaging modes,
    wherein different groups of settable setting items are set in the different imaging modes set by the mode setting unit, and
    wherein the display controller performs control such that the plurality of items in the first layer are displayed so that the setting items which are settable in one of the imaging modes set by the mode setting unit and the setting items which are not settable are discriminated from each other.

8. The electronic apparatus according to claim 7,
wherein settable setting values in the setting items are different according to the imaging modes set by the mode setting unit, and
wherein the display controller performs control such that setting values which are not settable in one of the imaging modes set by the mode setting unit are not displayed as the plurality of items in the second layer.

9. The electronic apparatus according to claim 1, wherein, in a case where the plurality of items included in the second layer is a plurality of child items, the plurality of items included in the first layer corresponding to the plurality of items included in the second layer is a plurality of parent items parental to the plurality of child items.

10. The electronic apparatus according to claim 1, wherein a part of the plurality of items included in the second layer is in some instances not displayed on the first display whereas all of the plurality of items included in the first layer are displayed on the first display.

11. The electronic apparatus according to claim 1, wherein a positional relationship between the first operation member and the second operation member is same as a positional relationship between a region where the plurality of items included in the first layer is displayed and a region where the plurality of items included in the second layer is displayed.

12. The electronic apparatus according to claim 1,
wherein the plurality of items included in the first layer and the plurality of items included in the second layer are displayable also on a second display different from the first display, and
wherein, on the second display, the selected item in the first layer is displayed at a third position, and the selected item in the second layer is displayed at a fourth position.

13. The electronic apparatus according to claim 12, wherein the second display has a smaller display region than that of the first display.

14. The electronic apparatus according to claim 1,
wherein the display control unit further displays the plurality of items included in the first layer and the plurality of items included in the second layer on a second display, and
wherein, on the second display, the display control unit performs control to display the selected item in the second layer changed by an operation on the second operation member at a predetermined display position, irrespective of a display position of the selected item in the first layer changed by an operation on the first operation member.

15. The electronic apparatus according to claim 1, wherein a captured image is displayed on the first display.

16. The electronic apparatus according to claim 15,
wherein the captured image is a reproduction image or a live-view image, and
wherein, on the first display, the items are superposed and displayed on the captured image.

17. A method for controlling an electronic apparatus including a first operation member and a second operation member different from the first operation member, the method comprising:
selecting one of a plurality of items included in a first layer in response to an operation on the first operation member;
selecting one of a plurality of items included in a second layer in response to an operation on the second operation member, the plurality of items included in the second layer becoming selectable as a result of selection of an item among the plurality of items included in the first layer; and
performing control to arrange, and display on a first display, the plurality of items included in the first layer in a first direction and arrange, and display on the first display, the plurality of items included in the second layer in the first direction such that the item that is currently selected among the plurality of items included in the first layer and the item that is currently selected among the plurality of items included in the second layer are arranged and displayed adjacent to each other in a second direction orthogonal to the first direction,
wherein, in the performing control, display positions of the plurality of items included in the first layer are not changed even when the selected item in the first layer is changed to another item by an operation on the first operation member, and, in response to a change of the selected item in the second layer to another item by an operation on the second operation member, the display positions of the plurality of items included in the second layer are changed such that the selected item in the second layer after the change comes to a position adjacent in the second direction to a display position of the selected item in the first layer and, in addition, a setting content of the selected item is displayed in the second layer in a display region of the selected item in the first layer,
wherein, after the selected item in the second layer is changed in response to an operation on the second operation member, the selected item in the first layer is changeable in response to an operation on the first operation member, and
wherein, each time the selected item in the first layer is changed to another item in response to an operation on the first operation member, performing control includes changing display of the selected item in the first layer displayed on the first display to display of the selected item in the second layer and arranging and displaying the selected item in the first layer and the selected item in the second layer adjacent to each other in the second direction.

18. A non-transitory computer readable storage medium storing a program to cause a computer to execute the method for controlling an electronic apparatus according to claim 17.

* * * * *